United States Patent
Davis et al.

(10) Patent No.: US 9,710,444 B2
(45) Date of Patent: Jul. 18, 2017

(54) ORGANIZING UNSTRUCTURED RESEARCH WITHIN A DOCUMENT

(71) Applicant: Microsoft Technology Licensing, LLC, Redmond, WA (US)

(72) Inventors: Tristan Alexander Davis, Redmond, WA (US); Ruth Kikin-Gil, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 473 days.

(21) Appl. No.: 13/899,583

(22) Filed: May 22, 2013

(65) Prior Publication Data

US 2014/0351680 A1 Nov. 27, 2014

(51) Int. Cl.
*G06F 17/00* (2006.01)
*G06F 17/24* (2006.01)
*G06F 17/30* (2006.01)

(52) U.S. Cl.
CPC .......... *G06F 17/24* (2013.01); *G06F 17/3061* (2013.01)

(58) Field of Classification Search
CPC ............. G06F 17/2235; G06F 17/2247; G06F 17/30864; G06F 17/211; G06F 17/30882; G06F 17/00
USPC ................................................ 715/201, 205
See application file for complete search history.

(56) References Cited

U.S. PATENT DOCUMENTS

| | | | |
|---|---|---|---|
| 5,233,687 A * | 8/1993 | Henderson, Jr. ...... | G06F 3/0481 715/788 |
| 7,707,498 B2 | 4/2010 | Jones et al. | |
| 8,402,392 B2 * | 3/2013 | Look ..................... | G06F 3/0481 715/773 |
| 8,767,020 B1 * | 7/2014 | Monikandan .......... | G06T 11/60 345/440 |
| 8,997,016 B1 * | 3/2015 | Maeng .................. | G06F 3/0481 715/240 |
| 2002/0102524 A1 * | 8/2002 | Rizzi ...................... | G09B 5/12 434/350 |
| 2004/0267871 A1 * | 12/2004 | Pratley ................... | G06Q 10/10 709/200 |
| 2006/0059426 A1 * | 3/2006 | Ogikubo ............. | G11B 27/034 715/723 |
| 2007/0106952 A1 | 5/2007 | Matas et al. | |

(Continued)

FOREIGN PATENT DOCUMENTS

WO  WO 2012164316 A1 * 12/2012

OTHER PUBLICATIONS

Greentree, Mark, "Notability for iPad: Much More Than a Note Taking App", Retrieved at <<http://www.macobserver.com/tmo/review/notability_for_ipad_much_more_than_a_note_taking_app>>, Aug. 31, 2012, pp. 10.

(Continued)

*Primary Examiner* — Scott Baderman
*Assistant Examiner* — Hassan Mrabi
(74) *Attorney, Agent, or Firm* — Christopher J. Volkmann; Kelly, Holt & Christenson, PLLC

(57) ABSTRACT

Research items are stored in a research organization space within a document. The research organization space is separate from the document workspace that contains the document, itself. User inputs are provided to modify the research items or the document, by including research items within the document. Research items or document content are modified based on the user inputs.

20 Claims, 28 Drawing Sheets

(56) References Cited

U.S. PATENT DOCUMENTS

| | | | |
|---|---|---|---|
| 2011/0016420 A1* | 1/2011 | Millman | G06F 3/0481 |
| | | | 715/771 |
| 2011/0179024 A1* | 7/2011 | Stiver | G06F 17/30675 |
| | | | 707/728 |
| 2012/0060098 A1 | 3/2012 | Libin et al. | |
| 2012/0254730 A1 | 10/2012 | Sunderland et al. | |
| 2013/0002647 A1 | 1/2013 | Bacus et al. | |
| 2013/0006986 A1* | 1/2013 | Phan | G06Q 10/10 |
| | | | 707/737 |
| 2013/0097490 A1* | 4/2013 | Kotler | G06F 17/21 |
| | | | 715/255 |

OTHER PUBLICATIONS

"Evernote for Business—A Quick Look", Retrieved at <<http://scbenterprises.wordpress.com/tag/evernote/>>, Dec. 4, 2012, pp. 2.
Jackson, Caroline, "How to Capture a Web Page for OneNote", Retrieved at <<http://www.ehow.com/how_8253978_capture-onenote.html>>, Retrieved Date: Mar. 6, 2013, pp. 3.

* cited by examiner

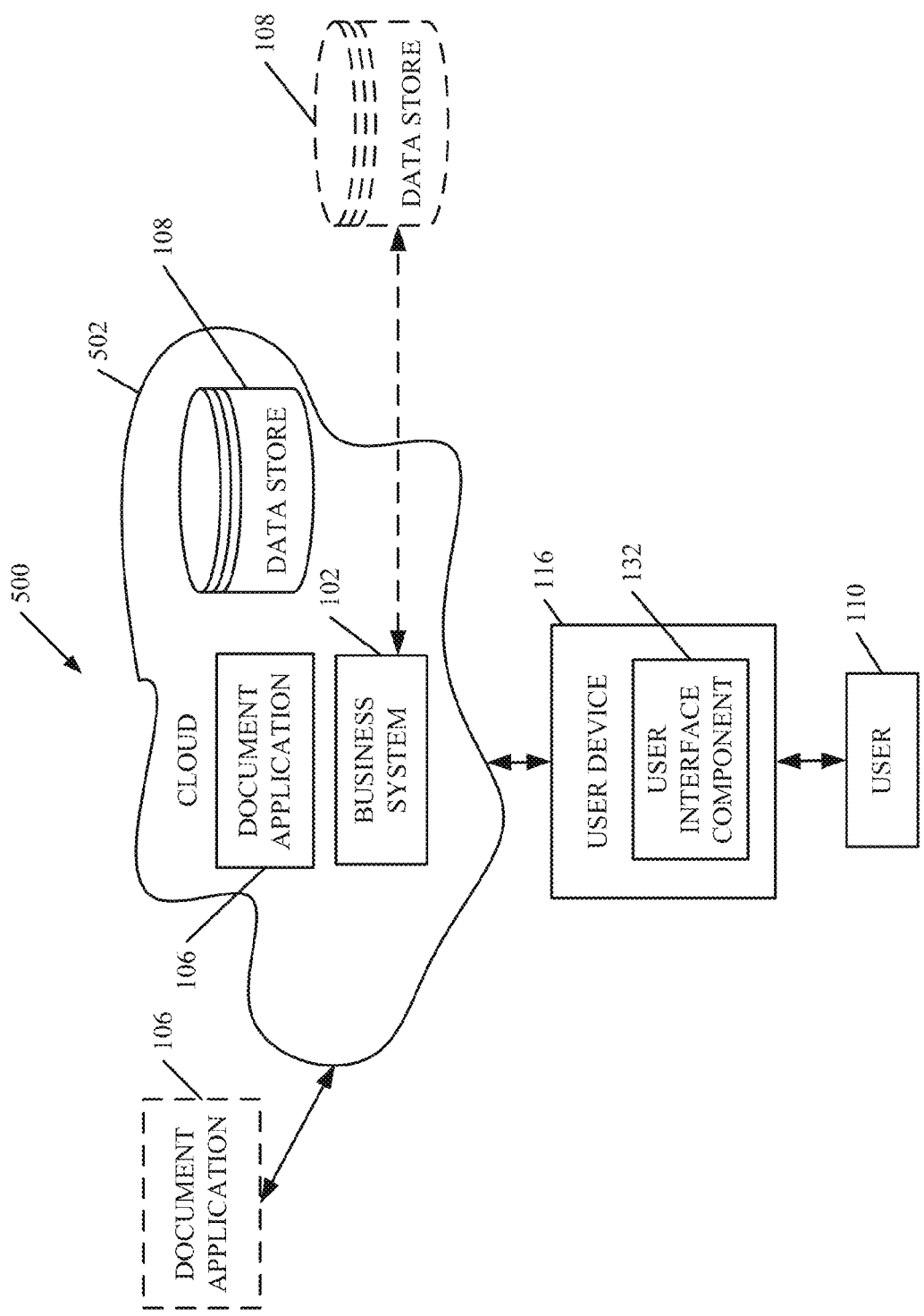

ORGANIZING UNSTRUCTURED RESEARCH WITHIN A DOCUMENT

BACKGROUND

There are a wide variety of environments in which documents are authored. The process of authoring a document often involves performing research on the particular topic that the document is to address. That research is then referenced in the process of creating the final document.

There are many different ways to perform research in order to author a document. Currently, the process often takes the following form, in general. The author first does some initial research into the topic of interest. The author often finds interesting data during the initial research process. That research is then printed off or electronically placed into a collaborative note taking application, or it can also be saved as a book mark in a browser, pasted into another document, saved alongside the final work product, or otherwise. Often, the author then begins to start writing the document.

In doing so, the author often attempts to keep all of the research available to him or her, so that the author remembers what information has been collected. That is, the author must attempt to remember which pieces of research (or research items) should be referenced or incorporated at corresponding locations in the document being authored. The author then reviews all the research to ensure that it was incorporated into the document and, if not, attempts to determine whether it is worth rewriting sections of the document to include the omitted research.

In general, this process is tedious, time consuming and error prone. The authors often find it difficult to manage the research themselves, entirely separately from the context of the final work product (or document) for which that research was collected.

The discussion above is merely provided for general background information and is not intended to be used as an aid in determining the scope of the claimed subject matter.

SUMMARY

Research items are stored in a research organization space within a document. The research organization space is separate from the document workspace that contains the document, itself. User inputs are provided to modify the research items or the document, by including research items within the document. Research items or document content are modified based on the user inputs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 4 shows one embodiment of the architecture of FIG. 1 implemented in various other architectures.

DETAILED DESCRIPTION

Figure 1:
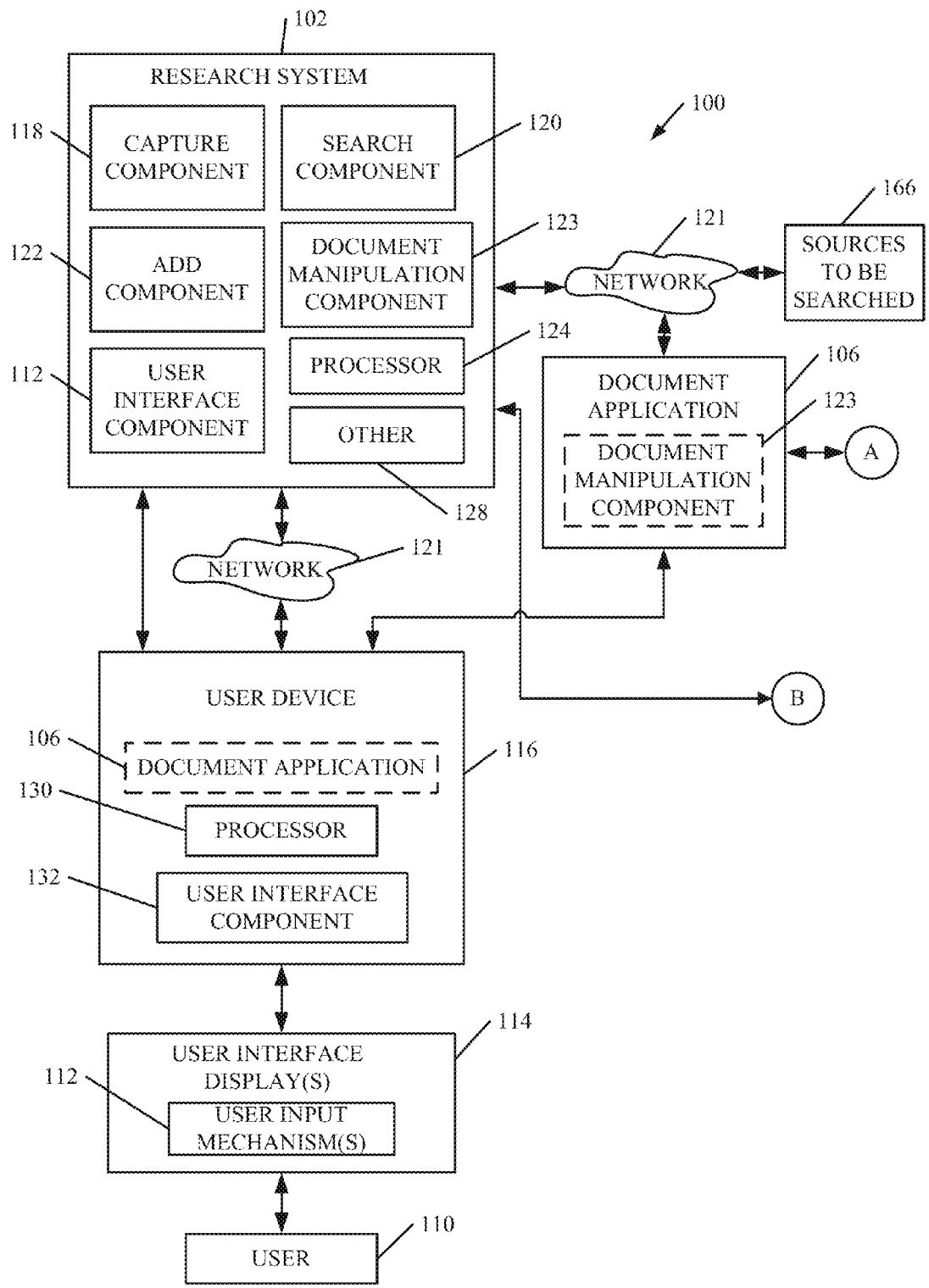
FIGS. 1 and 1A (collectively FIG. 1) show a block diagram of one embodiment of a research architecture.
Figure 1A:
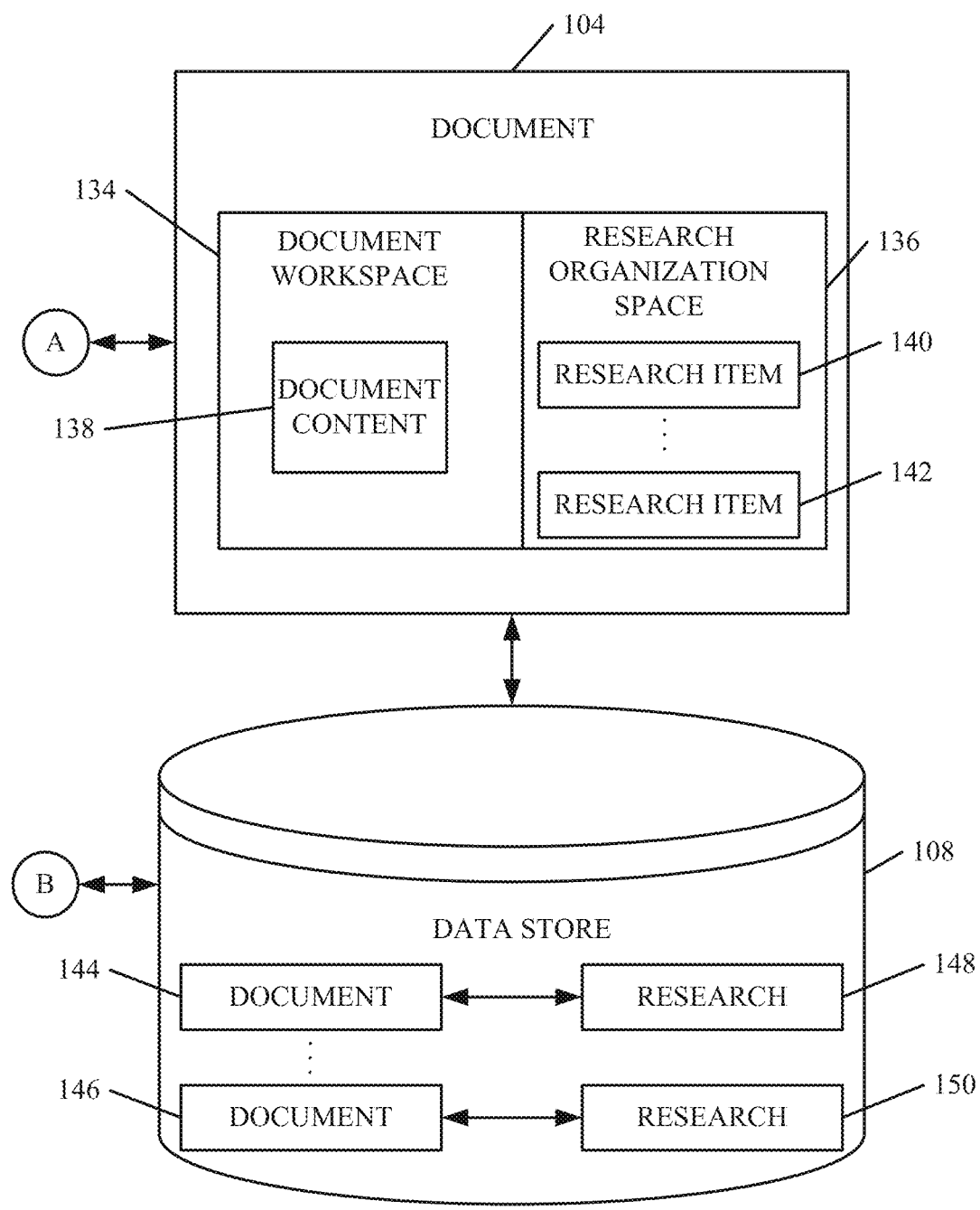

FIGS. 1 and 1A (collectively FIG. 1) show one embodiment of a document authoring architecture 100. Architecture 100 includes research system 102 that can be used in generating research for document 104 that is authored using a document application 106. The document and corresponding research can illustratively be stored in data store 108. FIG. 1 also shows that user 110 illustratively accesses research system 102 (and possibly document application 106) by interacting with user input mechanisms 112 on user interface displays 114 generated on a user device 116.

Research system 102 illustratively includes capture component 118, search component 120, add component 122, document manipulation component 123, processor 124, user interface component 126 and other components 128. Search component 120 is illustratively used by user 110 to search for research items that can be used in authoring document 104. Capture component 118 illustratively allows user 110 to capture the research items and add component 122 allows user 110 to add them to document 104. User interface component 112 illustratively generates user interface displays that can be provided for display on user device 116. Of course, user interface displays 114 can be generated using other components as well. The communication can be done over one or more of networks 121.

Document manipulation component 123 can be controlled by user 110 to manipulate research items and the document itself. Its functionality can be located in system 102 or document application 106, or both.

Processor 124 is illustratively a computer processor with associated memory and timing circuitry (not separately shown). It is illustratively a functional part of research system 102 and is activated by, and facilitates the functionality of, other components or items in research system 102.

User device 116 illustratively includes processor 130 and user interface component 132. It can also include document application 106. Of course, it can include other items as well and those shown are shown for the sake of example only. Processor 130 is illustratively a computer processor with associated memory and timing circuitry (not separately shown). It is illustratively a functional part of device 116 and is activated by, and enables functionality of, other items in device 116.

User interface component 132 illustratively generates user interface displays 114 (or can be used by other components or items in architecture 100 to generate user interface displays 114). User input mechanisms 112 are illustratively generated for interaction by user 110. User 110 illustratively interacts with user input mechanisms 112 to control and manipulate research system 102. The user input mechanisms 112 can take a wide variety of different forms. For example, they can be text boxes, icons, buttons, drop-down menus, check boxes, links, etc. They can also be actuated in a variety of different ways. For instance, if the display screen on which user interface displays 114 are displayed is a touch sensitive screen, they can be displayed using touch gestures (such as with a user's finger, a stylus, etc.). Further, if user device 116 or system 102 has speech recognition components, the user input mechanisms 112 can be actuated using speech commands. In addition, of course, they can be actuated using a point and click device (such as a mouse or trackball), using a hard or soft keyboard, a thumb pad or mouse pad, buttons, a joystick, etc.

FIG. 1 also shows that document 104 illustratively includes document workspace 134 and research organization space 136. Document workspace 134 illustratively includes the content portion (such as the final output) of document 104. The document content is indicated by block 138. Research organization space 136 illustratively includes research items 140-142 that are captured by user 110 using capture component 118 and added to document 104 using add component 122. These are described in greater detail below with respect to the remaining figures.

Data store 108 is illustratively used by research system 102 or document application 106, or both, in order to store documents 144-146. It should be noted that document 104 can be stored in some other location and simply referenced by research system 102. It is described as being stored in data store 108 for the sake of example. Also, the associated research 148 and 150 (each of which can contain multiple research items), respectively, is stored either separately from, or along with, documents 144-146. FIG. 1 shows that there is only a single data store 108. It will be noted that there can be multiple data stores, instead of only a single data store. In addition, all of the data stores can be local to research system 102 or remote from research system 102. In addition, some can be local while others are remote. Therefore, the single data store 108 is shown for the sake of example only.

Figure 2:
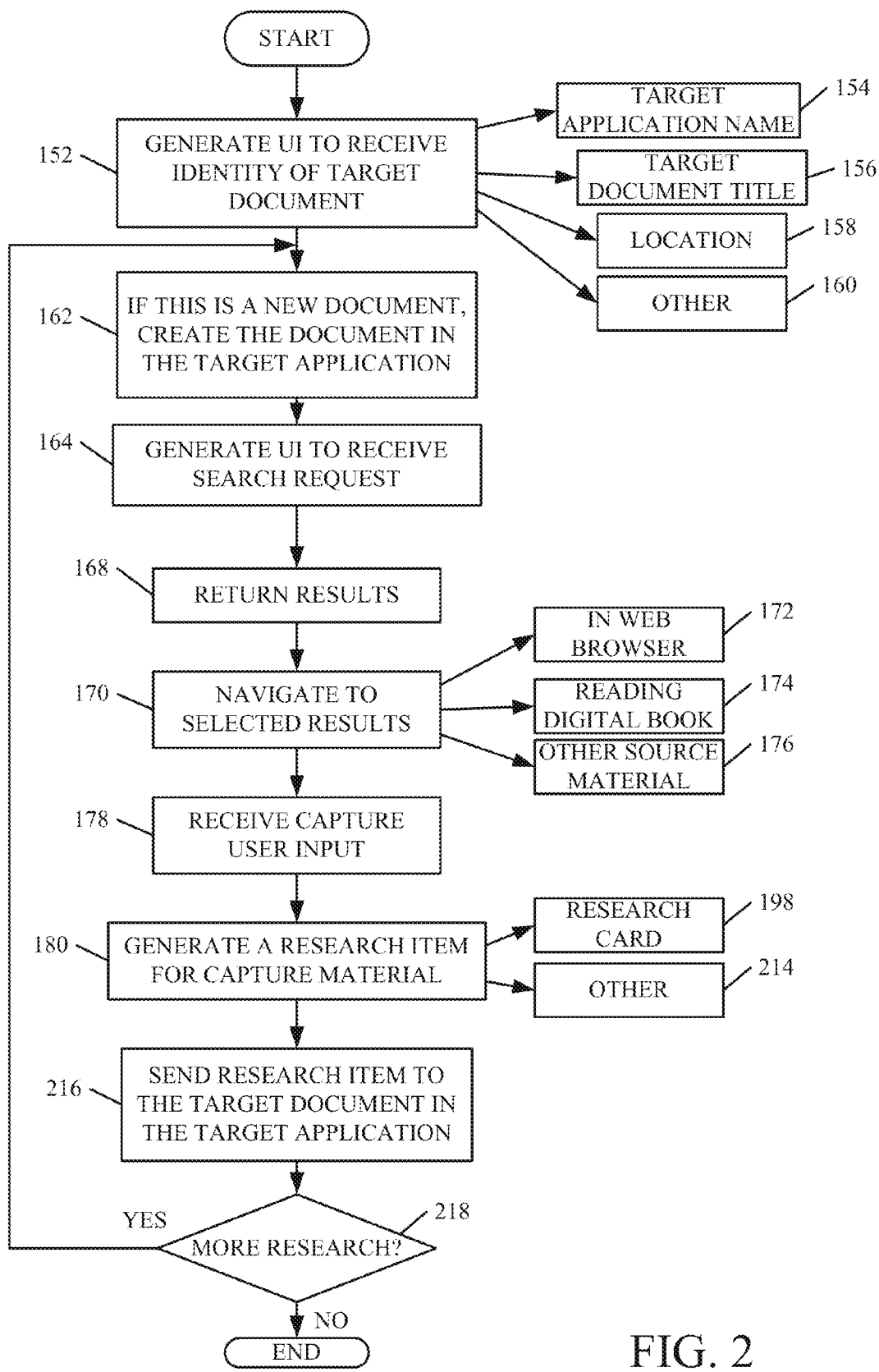
FIG. 2 is a flow diagram illustrating one embodiment of the overall operation of the architecture shown in FIG. 1 in obtaining research items for a document.

FIG. 2 is a flow diagram illustrating one embodiment of the overall operation of the architecture shown in FIG. 1 in capturing research items and adding them to document 104. To initiate this process, user 110 illustratively provides user inputs to indicate that user 110 desires to access research system 102. In response, research system 102 illustratively generates a user interface display to receive an identity of a target document that is to receive the research items generated during this session. Generating the user interface display to receive the identity of the target document is indicated by block 152 in FIG. 2. It will also be noted that the use of a user interface to make this connection is optional. The link may also be determined by the user's environment automatically (e.g., by what document is currently in focus).

In one embodiment, user 110 illustratively provides the target application name 154. For instance, if document 104 is a word processing document, then the target application name of document application 106 is the name of a word processing application. User 110 can also illustratively provide the target document title 156 and the location 158 where the target document is to be stored. Further, user 110 can provide other information 160 as well.

It may be that the target document has already been created during an earlier session. However, it may also be that user 110 is starting a new research project or document. Therefore, if the target document is a new document, then processor 124 creates the new target document in the target document application 106. This is indicated by block 162 in FIG. 2. If it is an existing document, of course, it need not be created.

Search component 120 then generates a user interface display to receive a research request from user 110, indicative of the subject matter of the target document or otherwise indicative of the subject being researched. Generating the UI display to receive a search request is indicated by block 164 in FIG. 2. Search component 120 then illustratively searches sources to be searched 166 for items of content that are related to the research request input by user 110. The sources 166 can be websites, indices, digital media, social networks, etc. This can be done over network 121 or by directly accessing sources 166, or in other ways. The search results are then returned to user 110. This is indicated by block 168 in FIG. 2.

In response, user 110 can illustratively provide user inputs to navigate to a selected search result. This is indicated by block 170 in FIG. 2. For instance, user 110 can navigate to a source within a web browser, as indicated by block 172. User 110 can access digital material in other ways as well, such as by opening a digital book 174. Of course, the research content can come from a blog, a digital magazine, or in other forms as well, and this is indicated by block 176.

When the user finds an item of interest, that the user wishes to obtain as a research item for document 104, the user illustratively provides a suitable user input that indicates to capture component 118 that the user wishes to capture the item as a research item. Receiving the capture user input is indicated by block 178 in FIG. 2. This can take a wide variety of different forms. For instance, user 110 can provide a user input that delineates the particular content that the user wishes to be captured as a research item. For instance, the user can outline or highlight a text or image or a combination of text and images, the user can simply highlight the address of a document (to obtain the whole document), the user can identify a video clip, or a portion of a video clip, the user can highlight text within a document, cells within a spreadsheet, etc. Of course, the user can provide a capture input identifying the particular content to be captured as a research item in other ways as well. For example, the user can provide the contents of the clipboard (e.g., through a paste user input).

In response, capture component 118 generates a research item for the captured material. This is indicated by block 180 in FIG. 2.

Figure 2A:
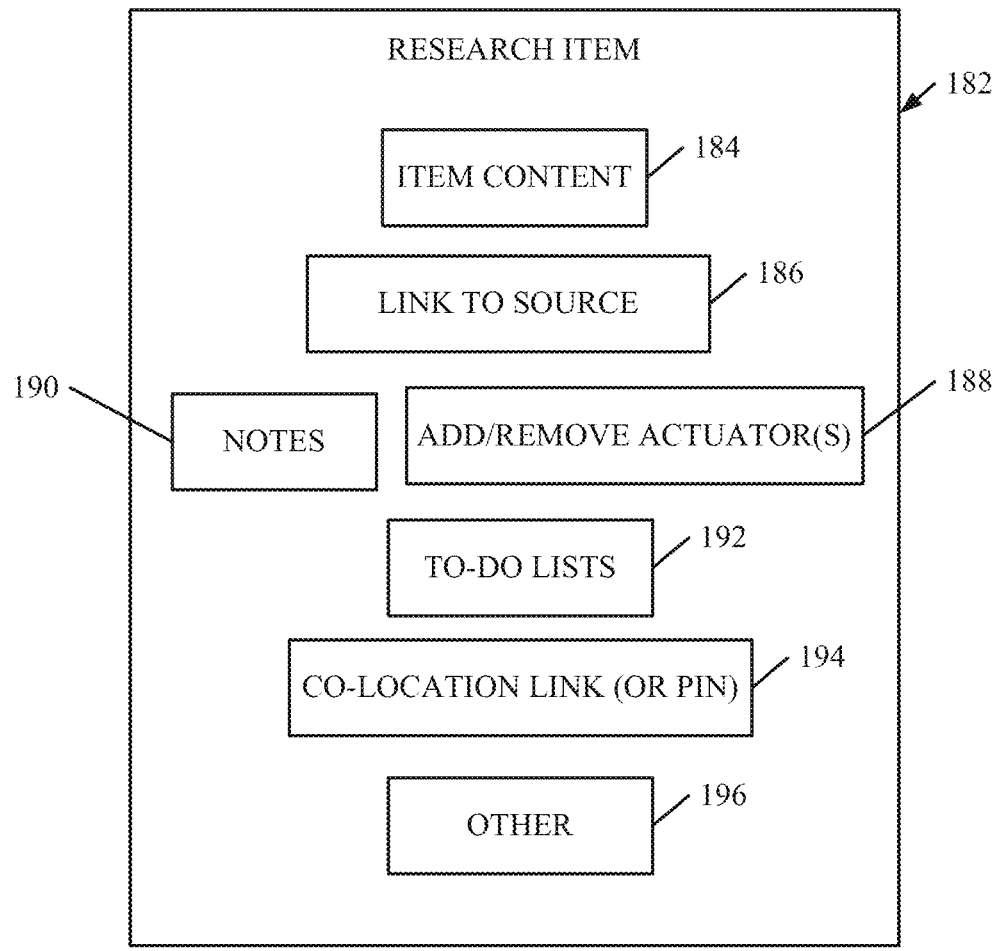
FIG. 2A is a block diagram of one embodiment of a research item.

FIG. 2A shows one illustrative block diagram of an example of a research item 182. In the embodiment shown in FIG. 2A, research item 182 illustratively includes the item content 184 (such as the text, the image, or the other content that was identified by user 110 with the capture input). In addition, item 182 illustratively includes a link 186 to the source document, the source website, the digital book, or the other source of the content 184. Research item 182 also illustratively includes add/remove actuators 188 that allow user 110 to add the research item 182 to the workspace of document 104 or to remove it entirely from document 104. This is described in greater detail below. Research item 182 also illustratively includes a notes portion 190 that includes notes that are input by user 110, that may indicate, for example, why this research item was captured in the first place. It can also include a to-do list 192 (which is described in greater detail below with respect to FIG. 2B). It can include a co-location link (or pin) that locates research item 182 relative to the content of the document itself. This is indicated by block 194. Of course, the research item 182 can include other information 196 as well.

Figure 2B:
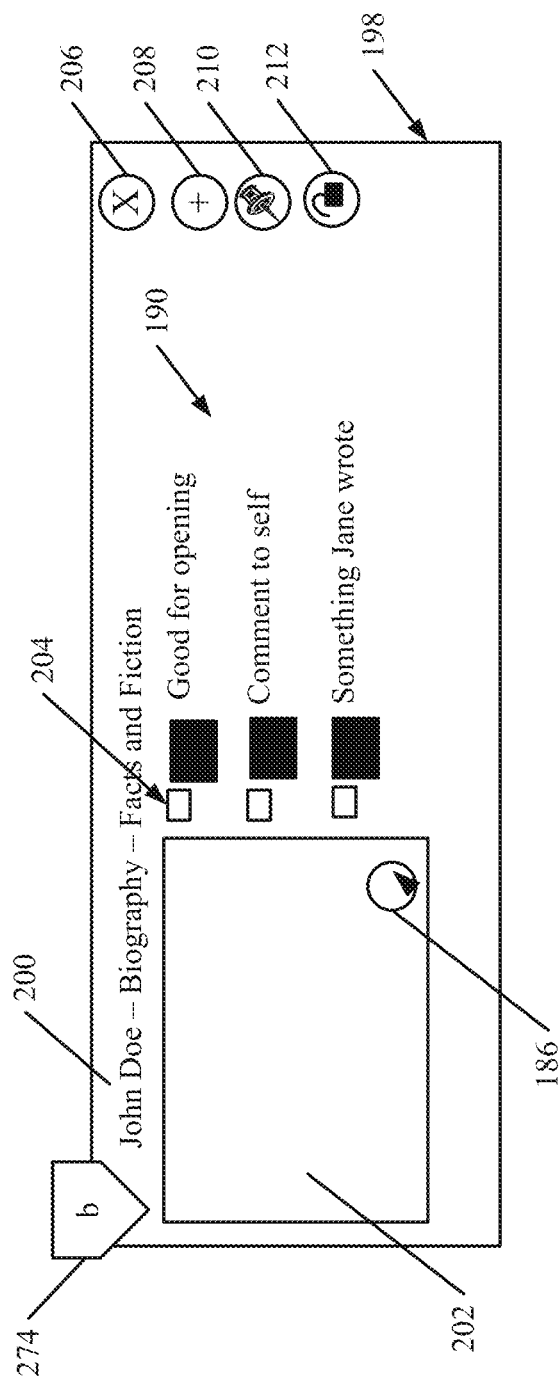
FIG. 2B is one illustrative user interface display of a research card representing a research item.

In one embodiment, research item 182 takes the form of a research card 198. FIG. 2B shows one embodiment of a user interface display of an exemplary research card 198. FIG. 2B shows that research card 198 illustratively includes a title portion 200 that shows a title for the particular research card 198. Research card 198 can also include a thumbnail portion 202. Thumbnail portion 202 can illustratively be an image, text, a link, or other item of content information that has been captured. In addition, card 198 illustratively includes link 186 back to the source from which the information in card 198 was captured. Card 198 shows notes 190 that can be added by a user to indicate why the research item was captured in the first place, it can include comments or it can include collaborative information that was provided by a collaborator (if the research project for which research item 198 was captured is a collaborative project).

In the embodiment shown in FIG. 2B, each of the items in notes portion 190 can have a check box 204. In this way, the user or collaborators can provide list items in notes portion 190 and make a to-do list out of the items. When an item in the to-do list has been completed, the user or collaborator can place a check in check box 204.

FIG. 2B also shows that card 198 includes remove actuator 206 and add actuator 208. These actuators allow the user to add research card 198 to the document or to remove it from the document (or even from the research organization space), if desired. Pin button 210 can be used by user 110 to collocate research card 198 with the document content 138 in document 104 (shown in FIG. 1). This is described in greater detail below. Briefly, however, the user can navigate to a position within the document content and use pin actuator 210 to link research card 198 to that location within the document content, itself.

FIG. 2B also shows that research card 198 includes a public source actuator 212. This allows the user to permit navigation to the source of research card 198, or to lock it (such as where the source is a subscription or proprietary source). It can also include a source mechanism indicator 274 that indicates the particular mechanism (browser, search service, etc.) used to obtain the research item.

Referring again to FIG. 2, the research items can be generated in other ways as well. This is indicated by block 214 in FIG. 2. The particular research card 198 was described above for the sake of example only.

Once capture component 118 has captured the research and generated a research item for the captured material, add component 122 illustratively adds the research item to the target document 104 in the target application 106. This is indicated by block 216 in FIG. 2. This can be done in a wide variety of ways as well. For instance, add component 122 can open the target document 104 within the document application 106, and add it. Alternatively, a different component can periodically obtain research items to be added to various documents within application 106. In that case, add component 122 illustratively saves the research items to a memory location which is accessed later by the alternate component. The alternate component then adds those items to the appropriate documents in application 106. Of course, the research items can be added to documents in other ways as well.

If user 110 wishes to perform additional research (as indicated by block 218 in FIG. 2), processing reverts back to block 164 where the user can provide additional research requests to search component 120, navigate to other search results, or open other sources of research material, etc.

Figure 3:
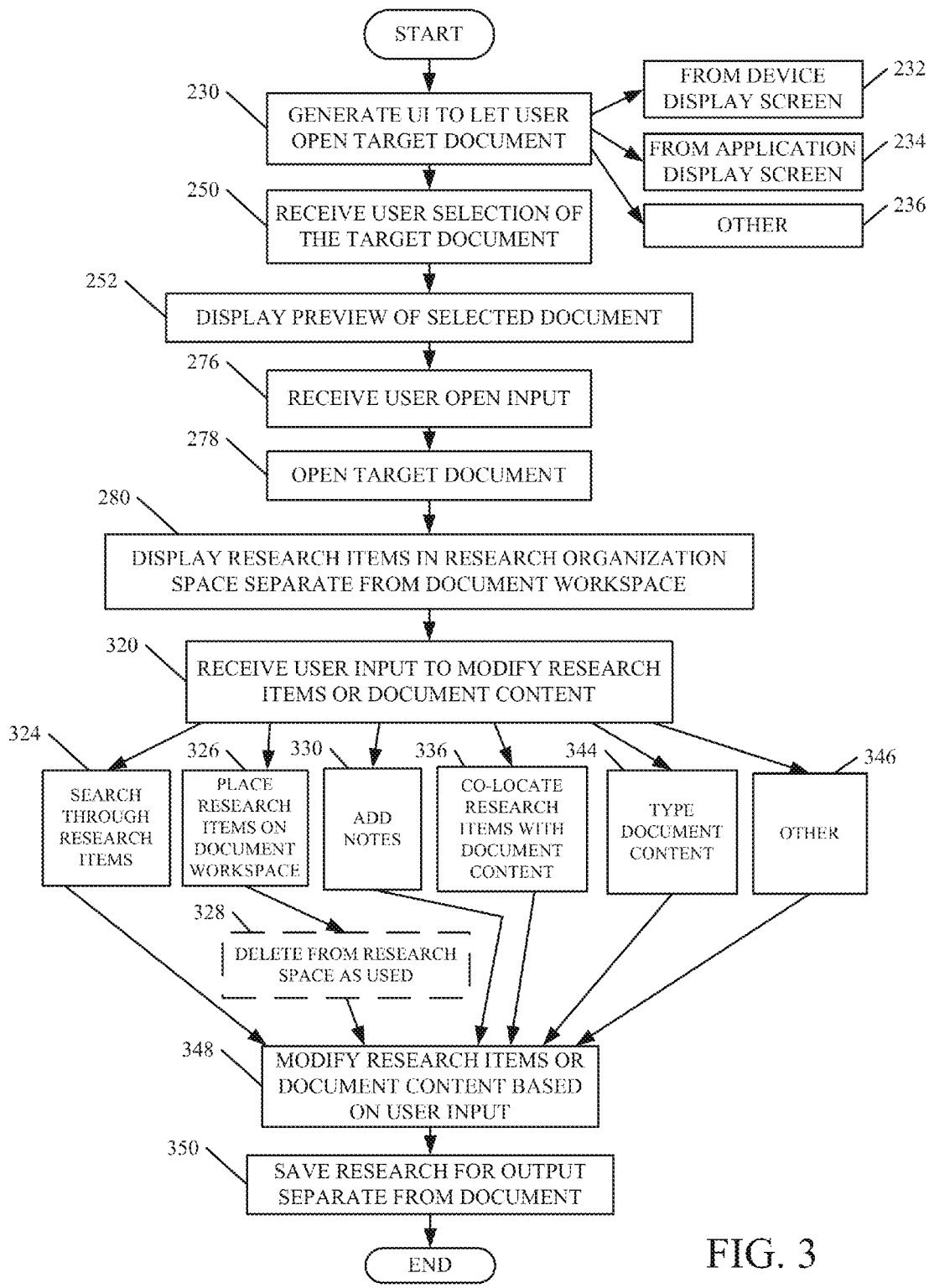
FIG. 3 is a flow diagram illustrating one embodiment of the architecture shown in FIG. 1 in performing operations on the research items, in order to author the document.

FIG. 3 is a flow diagram illustrating one embodiment of the operation of architecture 100 shown in FIG. 1 in generating document content 138 and moving research items 140-142 into document workspace 134, and performing other operations with respect to research items 140-142 and document 104. Document manipulation component 123 first generates a user interface display to allow user 110 to open target document 104. This is indicated by block 230 in FIG. 3. This can be done in a variety of different ways. For instance, document manipulation component 123 can allow the user to open document 104 from a device display screen on user device 116. This is indicated by block 232. The user can also illustratively open document 104 from an application display screen generated by document application 106. This is indicated by block 234. The user can illustratively open document 104 in other ways as well, as indicated by block 236.

Figure 3A:
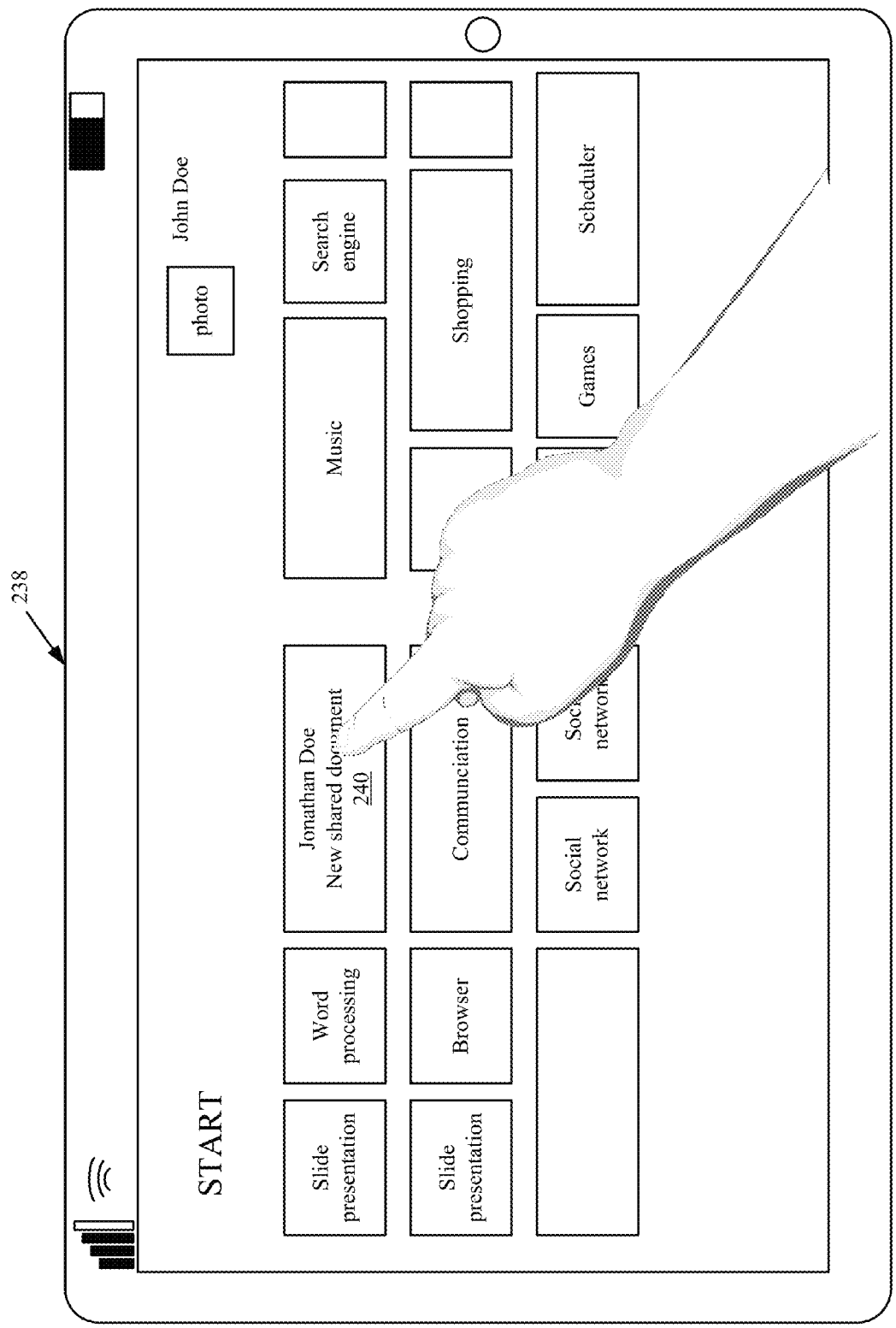
FIGS. 3A-3N are illustrative user interface displays.

FIG. 3A shows one embodiment of a user interface display 238 which represents a start screen generated by user device 116. It can be seen that start screen 238 includes a variety of tiles (or icons or other links) corresponding to applications, browsers, social networks, scheduling components, on-line shopping, music, communication, etc. In addition, display 238 illustratively includes a tile (or icon or other link) to document 104. This is indicated by link 240 in FIG. 3A. The user can actuate link 240 to be taken to a preview of document 104. Or actuation of link 240 can simply open the document.

Figure 3B:
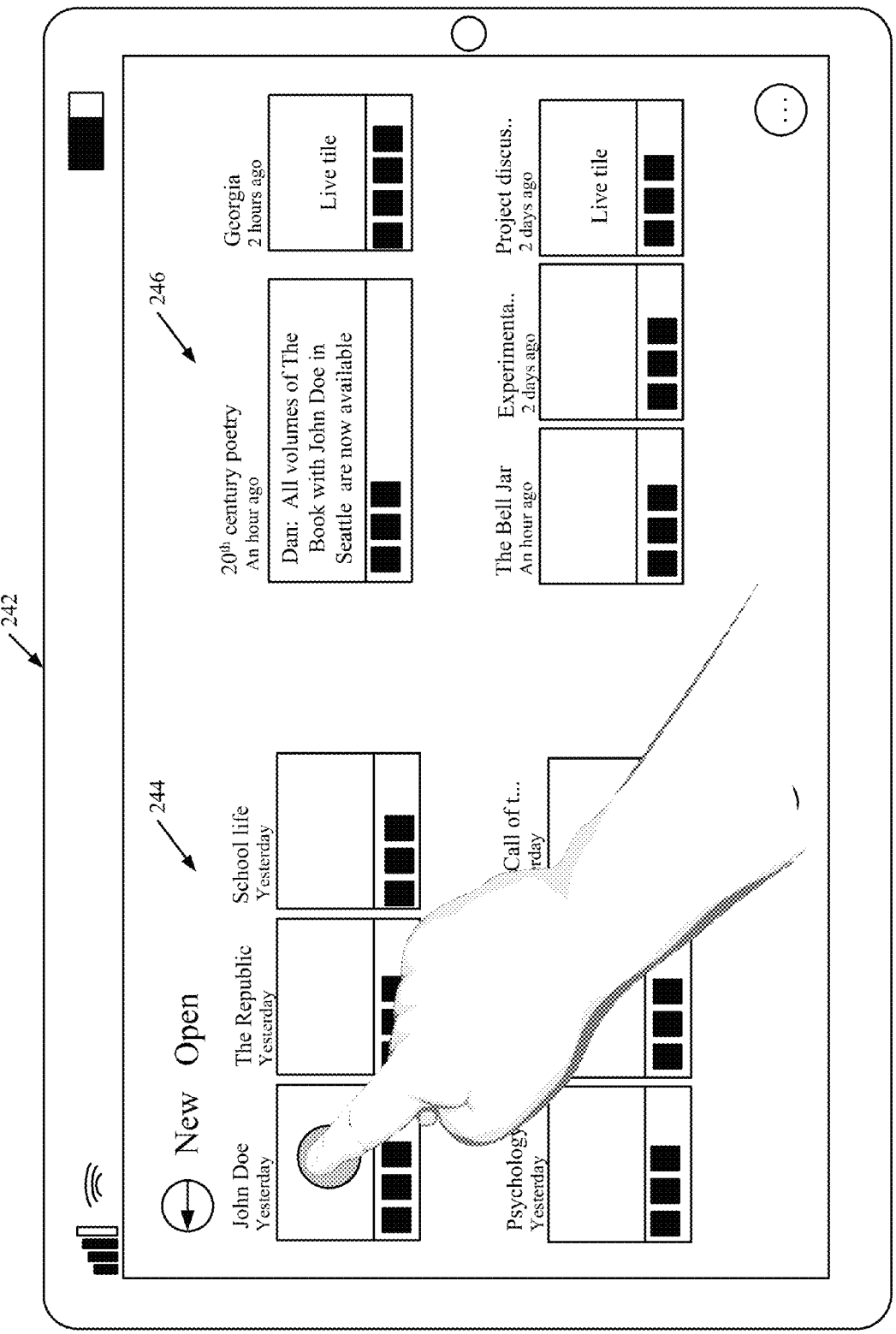

FIG. 3B shows another illustrative user interface display 242. User interface display 242 is illustratively a screen generated by the document application 106 that generated document 104. In the embodiment shown in FIG. 3B, user interface display 242 is illustratively broken into the recent section 244 that shows user actuable input mechanisms (such as tiles or links) to recently opened documents, and an active section 246 that includes user actuatable input mechanisms (such as tiles or links) that navigate the user to currently opened projects. When the user actuates one of the user input mechanisms in recent section 244, this illustratively causes document manipulation component 123 to either generate a preview of the corresponding document, or to open the document itself.

Figure 3C:
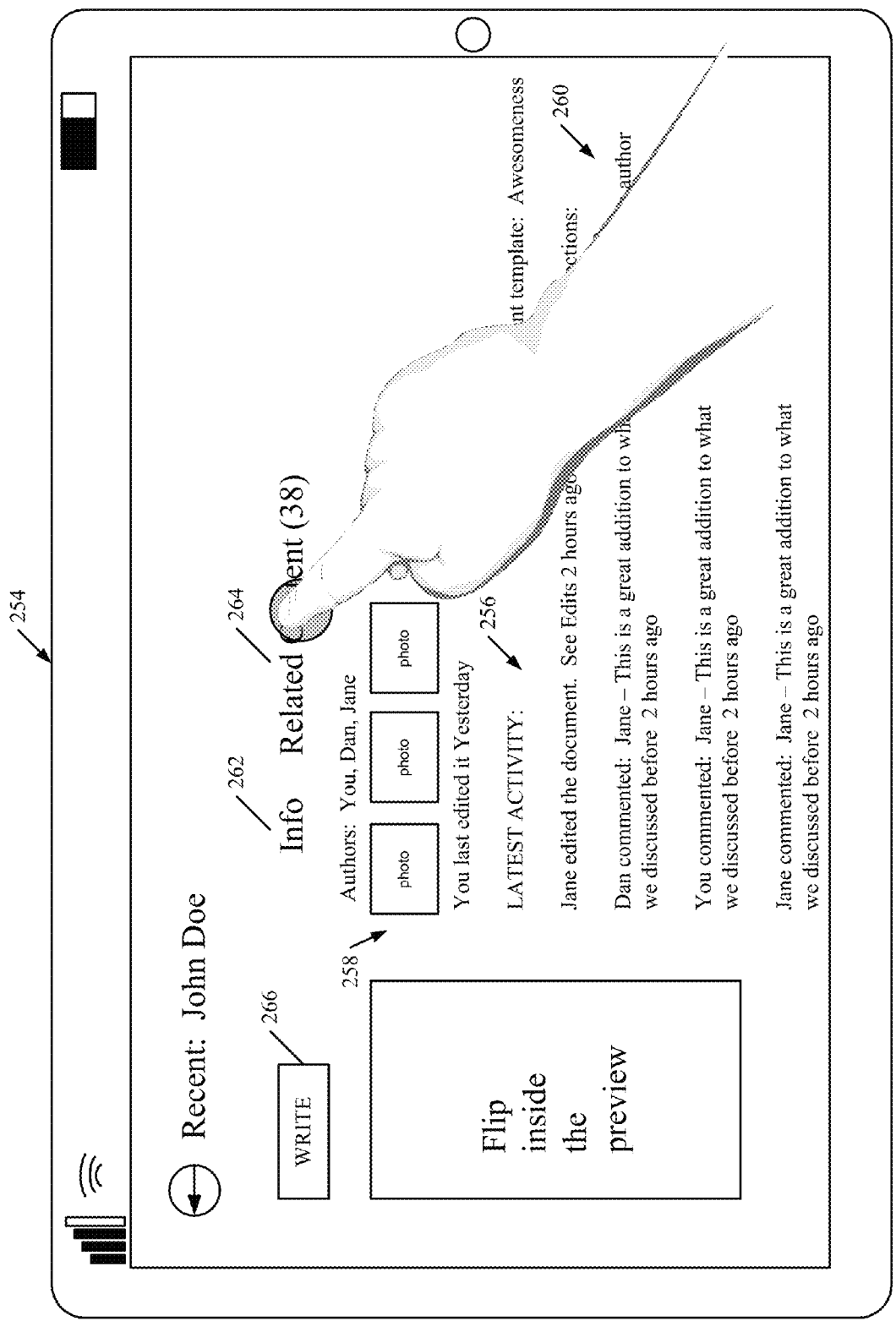

Receiving user selection of an icon or other user input mechanism corresponding to the target document, is indicated by block 250 in the flow diagram of FIG. 3. Displaying a preview of the selected document is indicated by block 252. FIG. 3C shows one embodiment of a user interface display 254 that shows a preview of a selected document 104. The preview in user interface display 254 shows general information, including recent activity displayed in latest activity section 256. The activity can include edits to document 104, conversations had related to document 104, and other information as well. In addition, where document 104 is being created in a collaborative environment, it can include a list of collaborators 258 and it can also indicate which sections of document 104 are assigned to which collaborator, as indicated by 260. In addition, user interface display 254 includes an information user input mechanism 262, a related content user input mechanism 264 and a write user input mechanism 266.

When the user actuates user input mechanism 262, it illustratively navigates the user to more general information about document 104. When the user actuates related content user input mechanism 264, it illustratively navigates the user to the related content or research items generated for the corresponding document, and when the user actuates write user input mechanism 266, it illustratively opens the underlying document that allows the user to edit the document 104, itself.

Figure 3D:
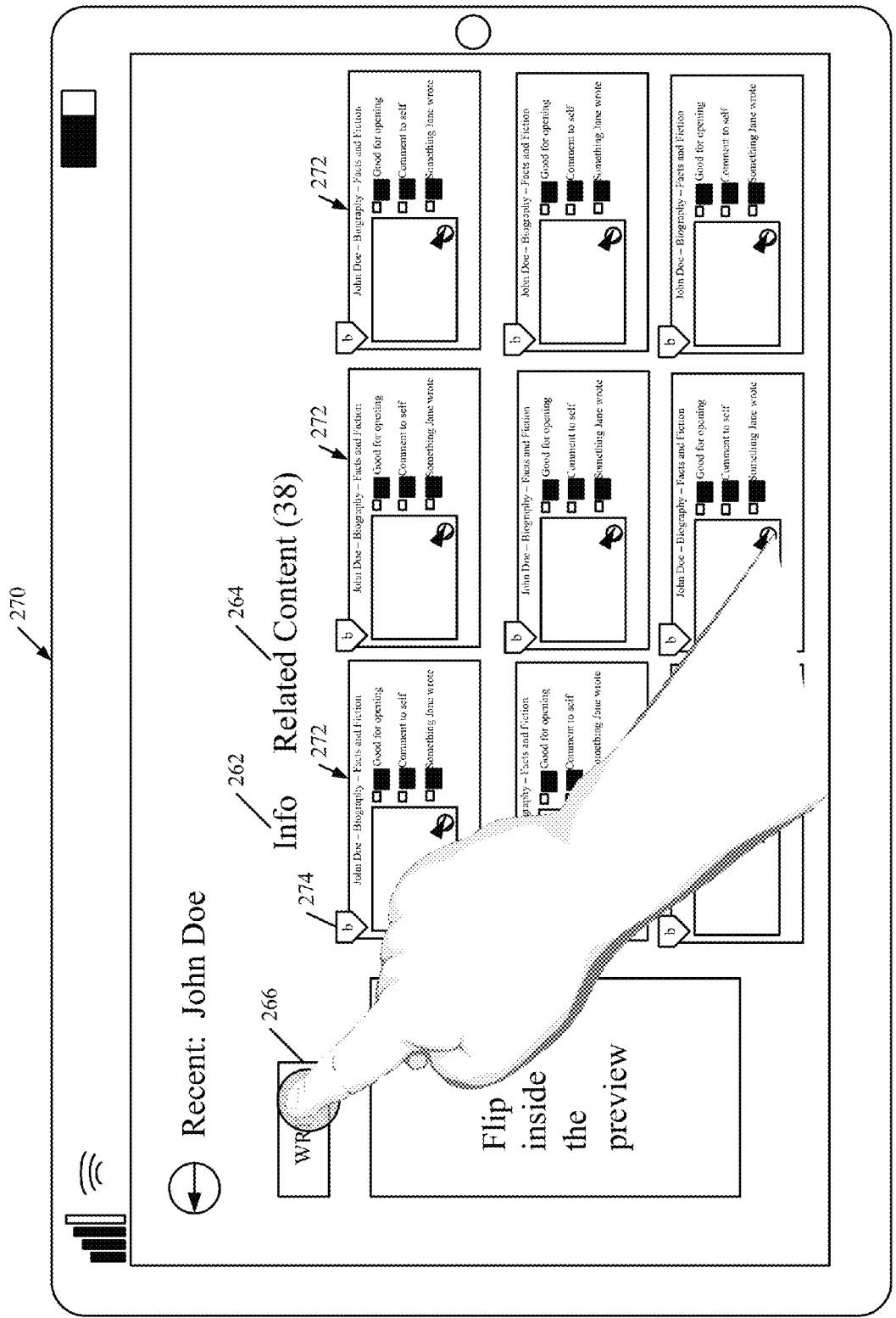

FIG. 3C shows that the user is actuating the related content user input mechanism 264. This illustratively causes document manipulation component 123 to generate a user interface display, such as user interface display 270 shown in FIG. 3D. User interface display 270 shows that document manipulation component 123 has generated a display of the research items corresponding to the underlying document. Each of the research items is shown with a corresponding research card 272. FIG. 3D also shows that, each research card has a source mechanism indicator 274 associated with it. Source mechanism indicator 274 indicates the mechanism by which the source was obtained. For instance, if the information was obtained through a particular web browser or search engine, indicator 274 will identify this. If the information was obtained from a digital book, indicator 274 will identify this.

FIG. 3D also shows that the user is actuating the write user input mechanism 266. This causes document manipulation component 123 to open the underlying document. Receiving the user write (or open) input is indicated by block 276 in the flow diagram of FIG. 3, and opening the target document is indicated by block 278.

Figure 3E:
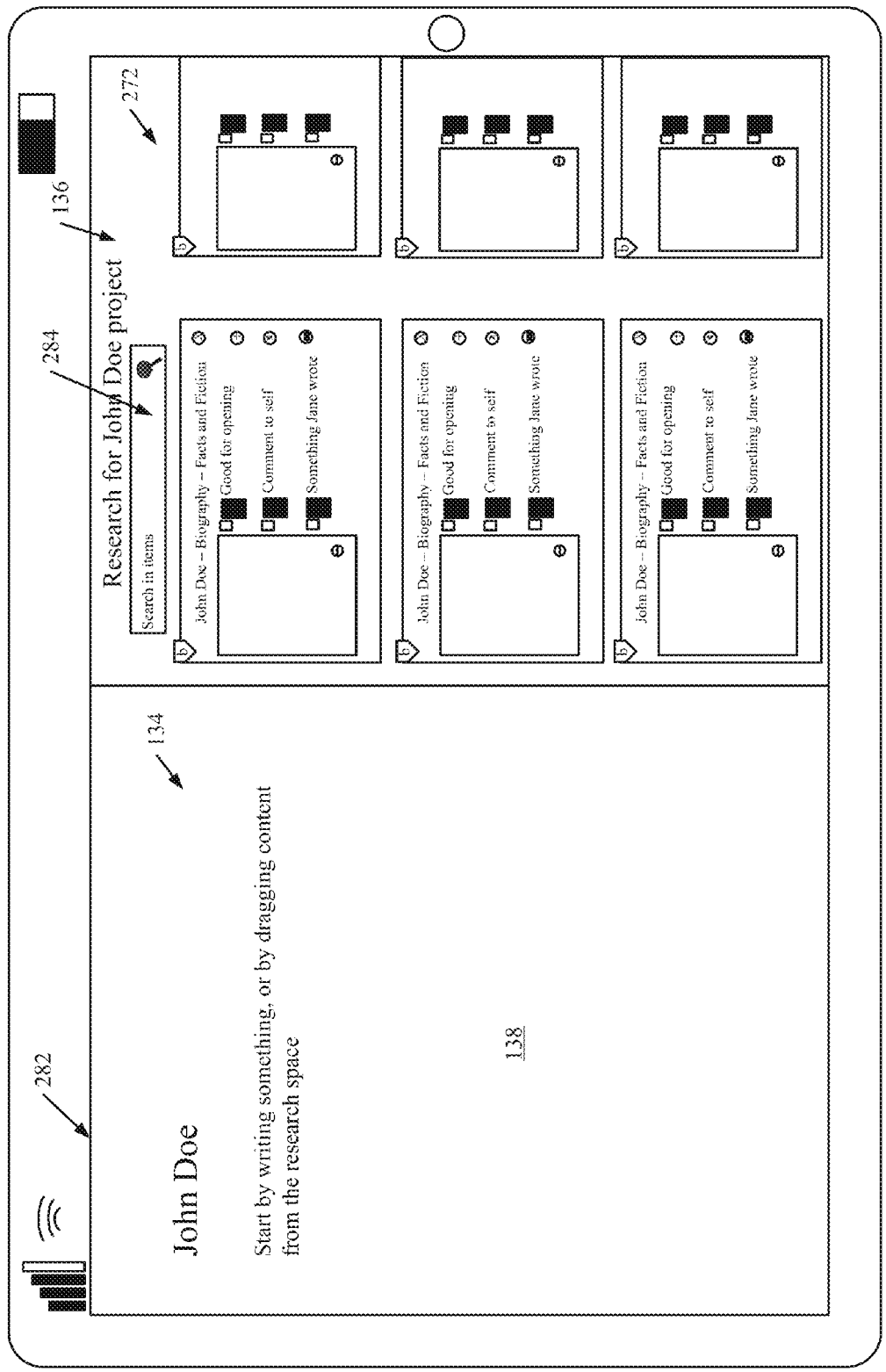

Document manipulation component 123 generates a user interface display that displays the research items in the research organization space, separate from the document content in the document workspace. This is indicated by block 280 in FIG. 3. FIG. 3E shows one embodiment of a user interface display 282 which illustrates this. In display 282, it can be seen that the research organization space 136 is displayed on the right hand side of the display screen, while the document content 138 is displayed in the document workspace 134 on the left hand side of the screen. Of course, the items could be displayed on different sides, or in a top/bottom arrangement as well, and the arrangement shown in FIG. 3E is shown for the sake of example only.

In the embodiment shown in FIG. 3E, research organization space 136 illustratively has a search user input mechanism 284. This allows user 110 to search through the research items 272 shown in research organization space 136 based on a keyword or other search input. Thus, the research items 272 are independently searchable relative to the document content 128 in document workspace 134.

Figure 3F:
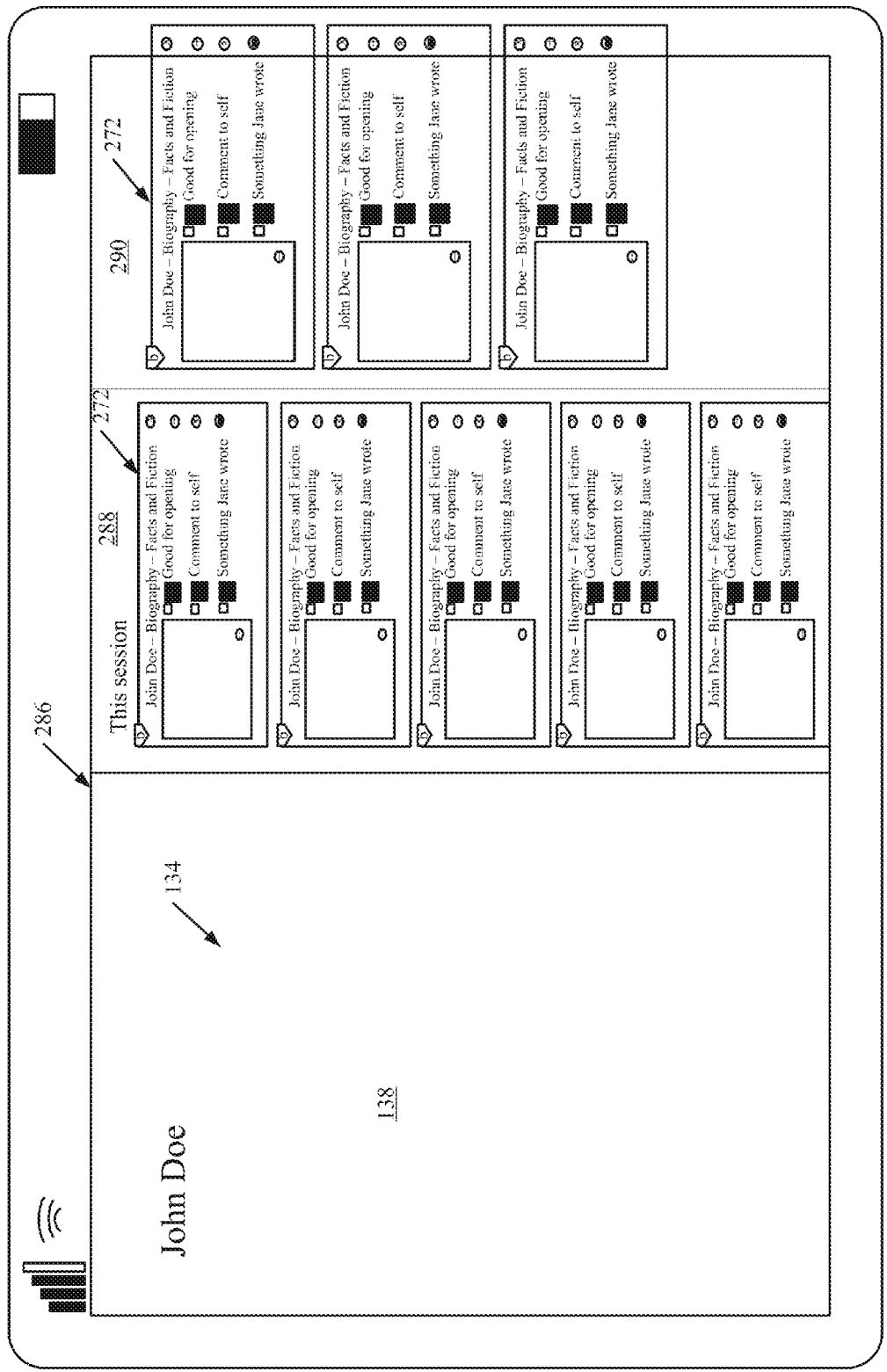

FIG. 3F shows another embodiment of a user interface display 286. In user interface display 286, the research organization space 136 is broken into two separate spaces. The first is to store research items 272 that have been generated during this particular session of document authoring, in pane 288. The remaining research items (which were not generated during this particular session) are shown in pane 290, which is illustratively visually separated from pane 288.

Figure 3G:
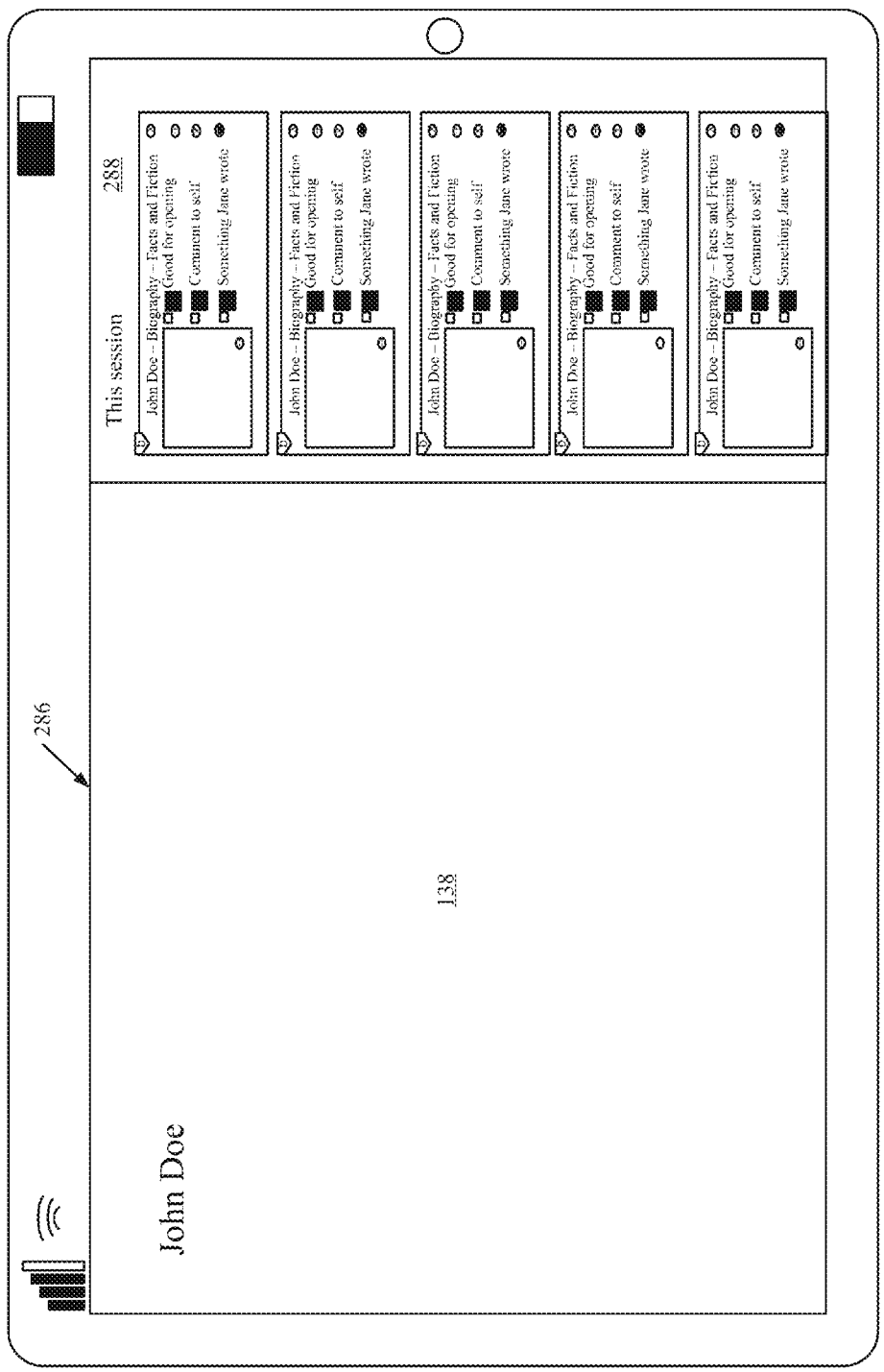

FIG. 3G shows yet another embodiment in which only pane 288 is shown in research organization space 136. In one embodiment, the user can use a suitable user input (such as a swipe gesture, or another input) in order to expose or hide pane 290 (shown in FIG. 3F).

Figure 3H:
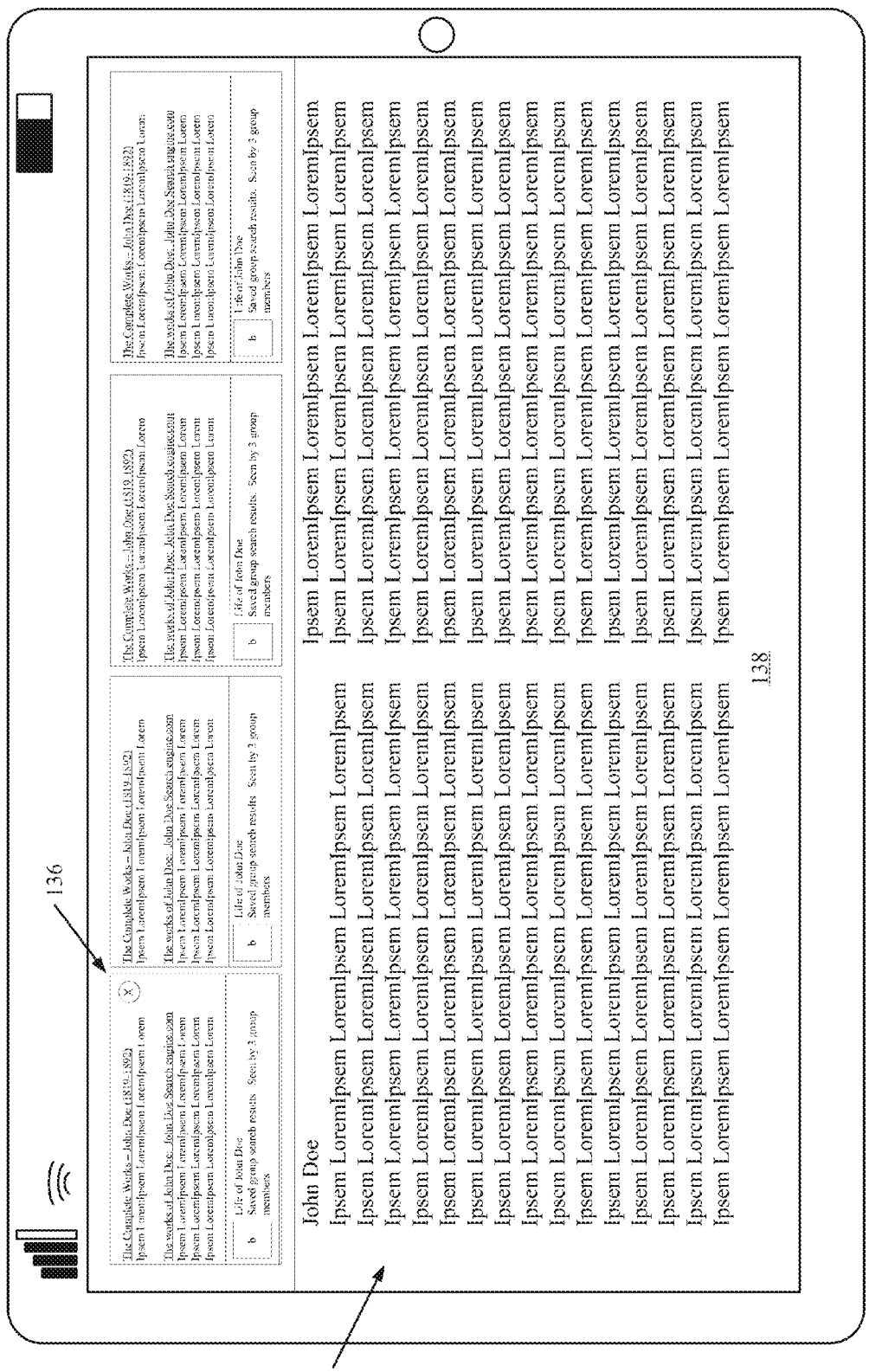

FIG. 3H shows yet another embodiment of a user interface display 290. User interface display 290 shows that the research organization space 136 is shown at the top of the page, while the document workspace 134 is shown on the lower portion of the page. Of course, displaying the research items in the research organization space, separate from the document workspace can be done in other ways as well, and those shown in the previous figures are shown by way of example only.

Figure 3I:
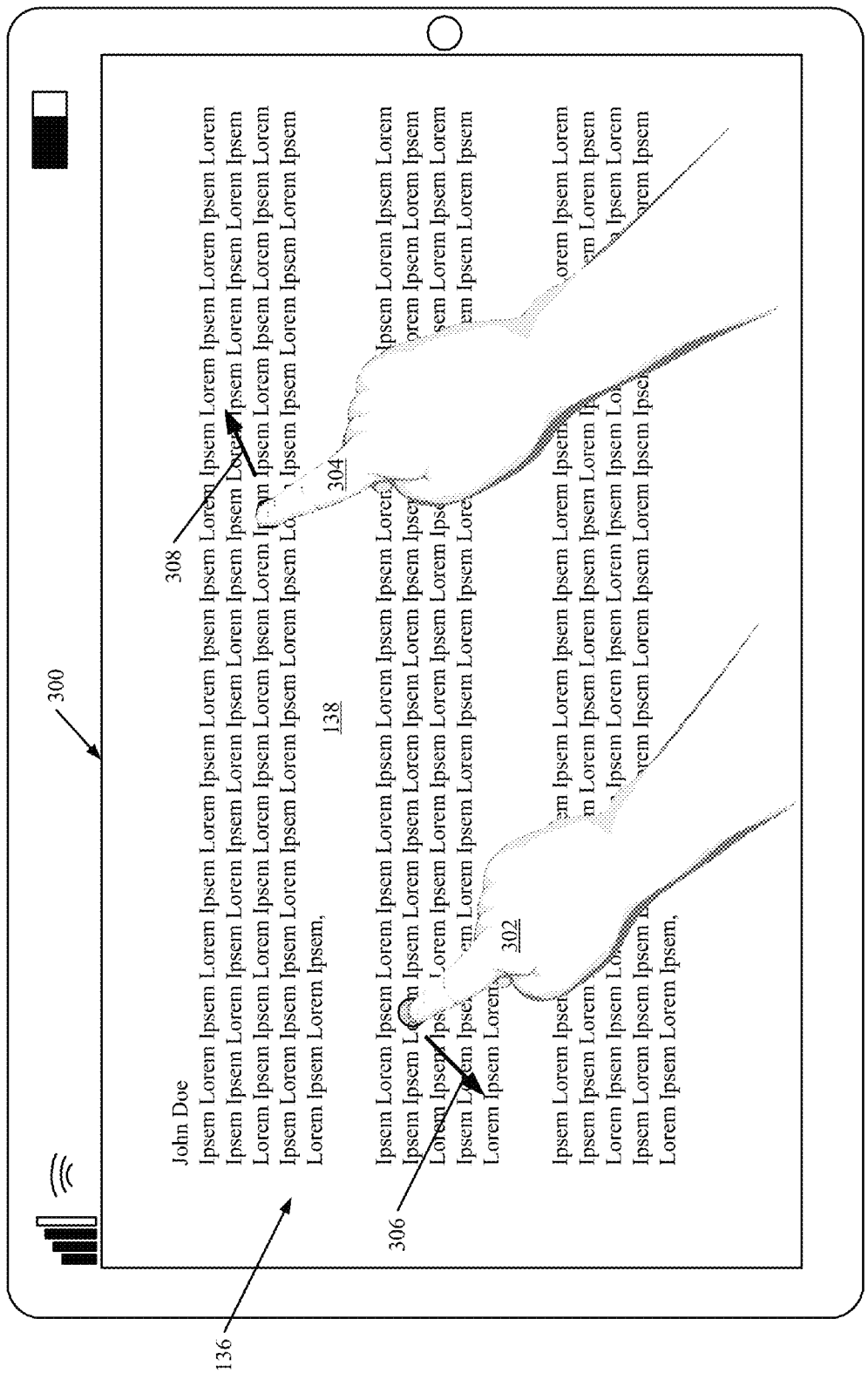

It will also be noted that the research items can be displayed in other ways as well. For instance, where the user 110 initially opens the document 104, document manipulation component 123 may simply display the document content 138 in document workspace 134, taking up the entire visual display. Then, user 110 can provide an additional user input in order to have the research organization space 136 displayed, along with the corresponding research items. For instance, FIG. 3I shows a user interface display 300 where the user has opened document 104, and only the document content 138 in document workspace 136 is shown. Then, in order to obtain a display of research organization space 136 with its associated research items, the user provides an additional user input. In the embodiment shown in FIG. 3I, the user is using a spread touch gesture to invoke display of research organization space 160. In order to do this, user 110 illustratively places his or her fingers 302 and 304 at different points on the user interface display 300 and moves them away from each other generally in the directions indicated by arrows 306 and 308, respectively. This causes document manipulation component 123 to generate a display of research organization space 136, in a way that is, again, visually separated from the document content 138 in document workspace 134.

Figure 3J:
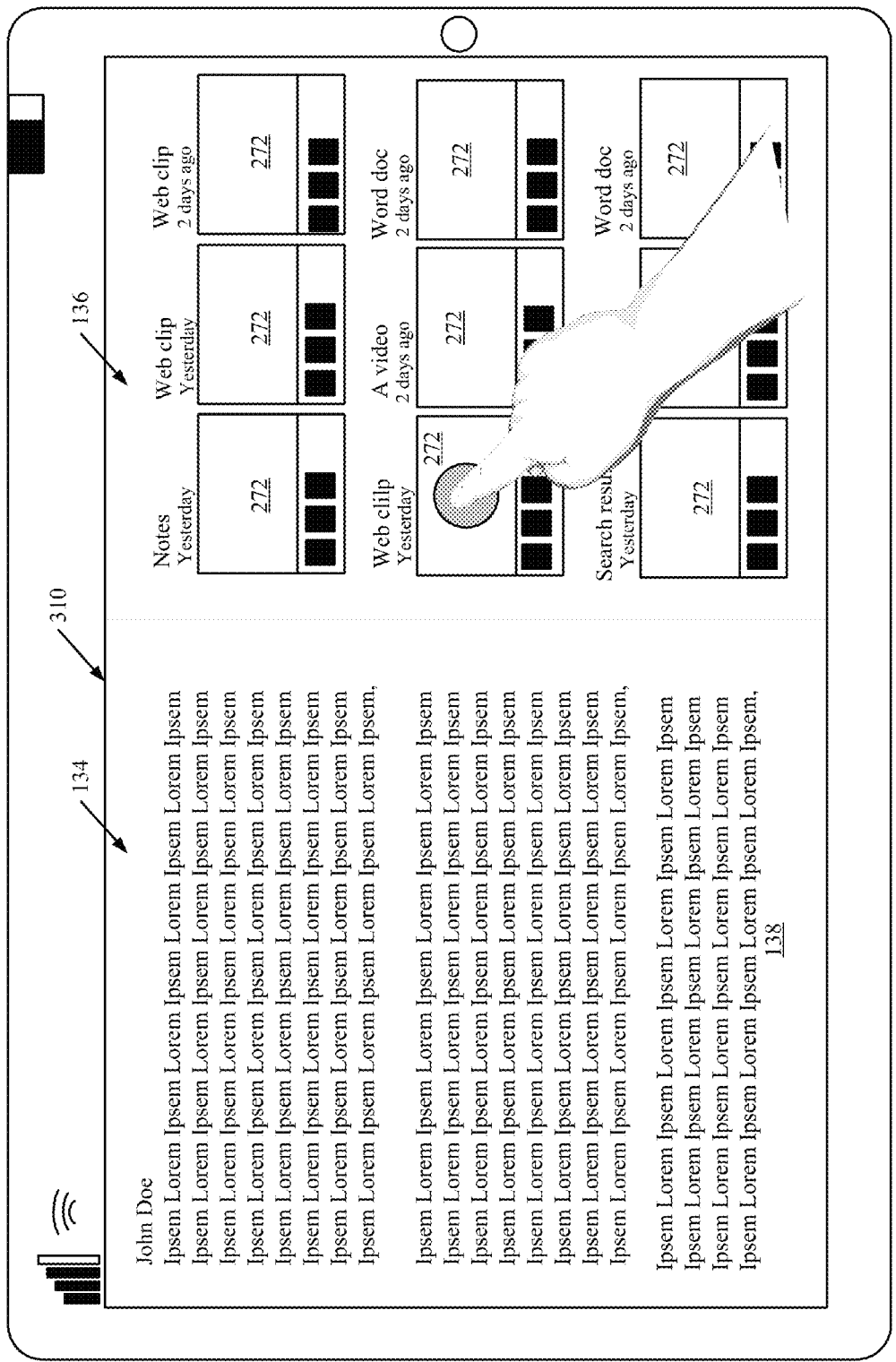

FIG. 3J shows one embodiment of a user interface display 310 that shows this. For instance, once the user has provided the user input (such as the spread touch gesture) document manipulation component 123 reflows the text in document content 138 in document workspace 134 and displays the research items 272 in research organization space 136, without obstructing the view of the document 138. Space 136 is again illustratively visually distinguished from workspace 134. Once the research items are displayed in research organization space 136, separate from the document content 138 in document workspace 134 (in any of the forms described above, or in other ways), user 110 can illustratively provide a user input to modify either the research items in research organization space 136, or the document content 138, or both. Receiving such a user input is indicated by block 320 in the flow diagram of FIG. 3. These user inputs can be one of a variety of different types of user inputs.

Figure 3K:
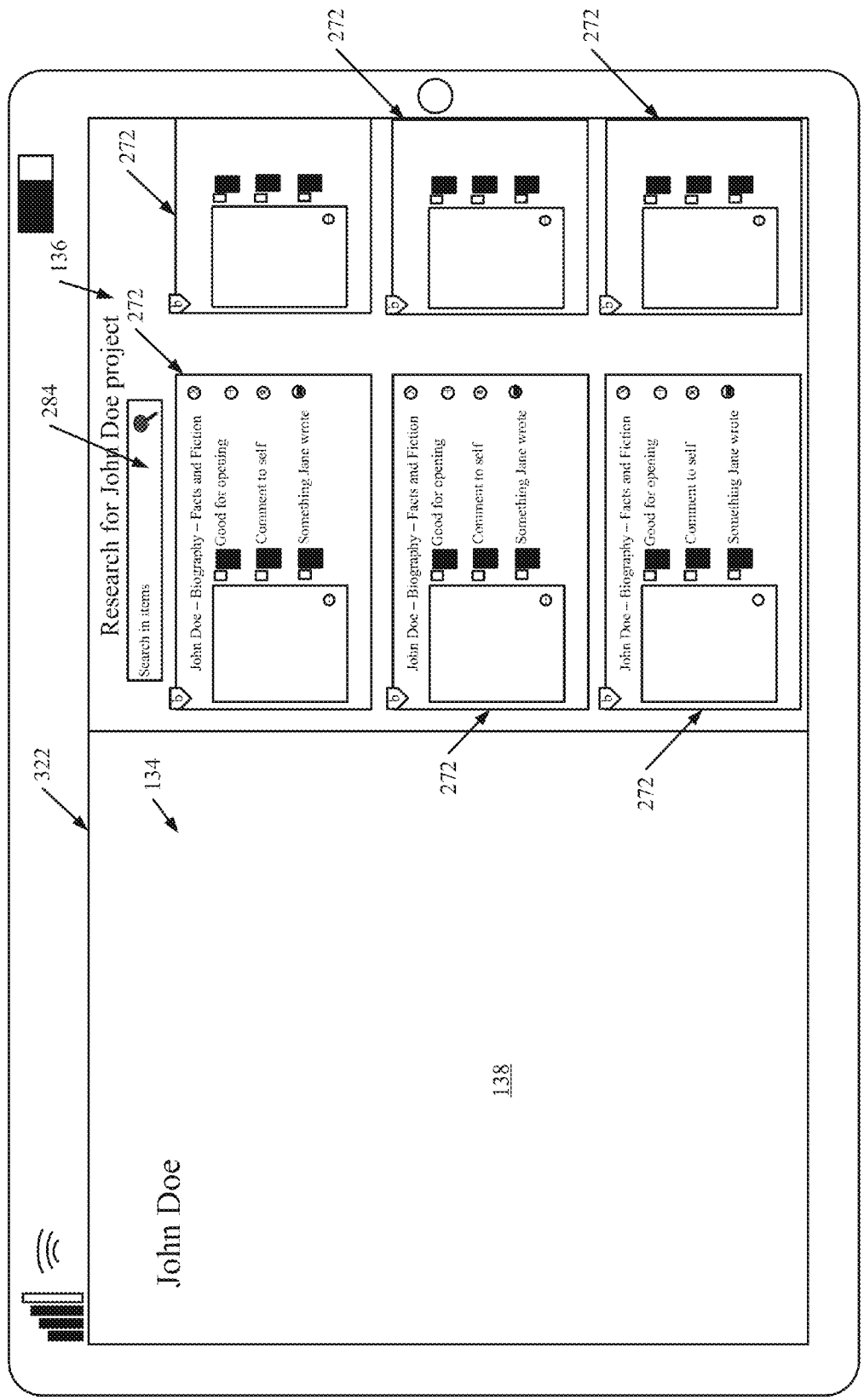

For example, FIG. 3K shows a user interface display 322, that is similar to user interface display 282 shown in FIG. 3E, and similar items are similarly numbered. By way of example, the user can type a keyword or other search request into text box 284 and search through the research items 272 stored in research organization space 136. This is indicated by block 324 in the flow diagram of FIG. 3. In addition, the user can place research items 272 on the document workspace 134. This can be done using a drag and drop operation, or in other ways. This is indicated by block 326 in the flow diagram of FIG. 3. In addition, in one embodiment, as the user drags a research item 272 from research organization space 136 to document workspace 134, that research item is deleted from research organization space 136. This enables the user 110 to quickly determine whether he or she has used all of the research items that were collected during the research phase. Deleting the research items 272 is indicated by block 328 in FIG. 3. The user interface display of FIG. 3K shows that the user has dragged one of research items 272 from research organization space 136 to document workspace 134, using a touch gesture. This causes document manipulation component 123 to move that research item 272 into the document workspace 134. It can be merged with content 138, or simply placed within content 138 as a separate object.

As user 110 is manipulating research items 272 (such as reordering them, dragging them into workspace 138, etc.) the user may wish to add notes to any given research item 272 in order to add contents or in order to remind the user of what he or she is to do with this particular research item later, when actually typing the text of document content 138.

Figure 3L:
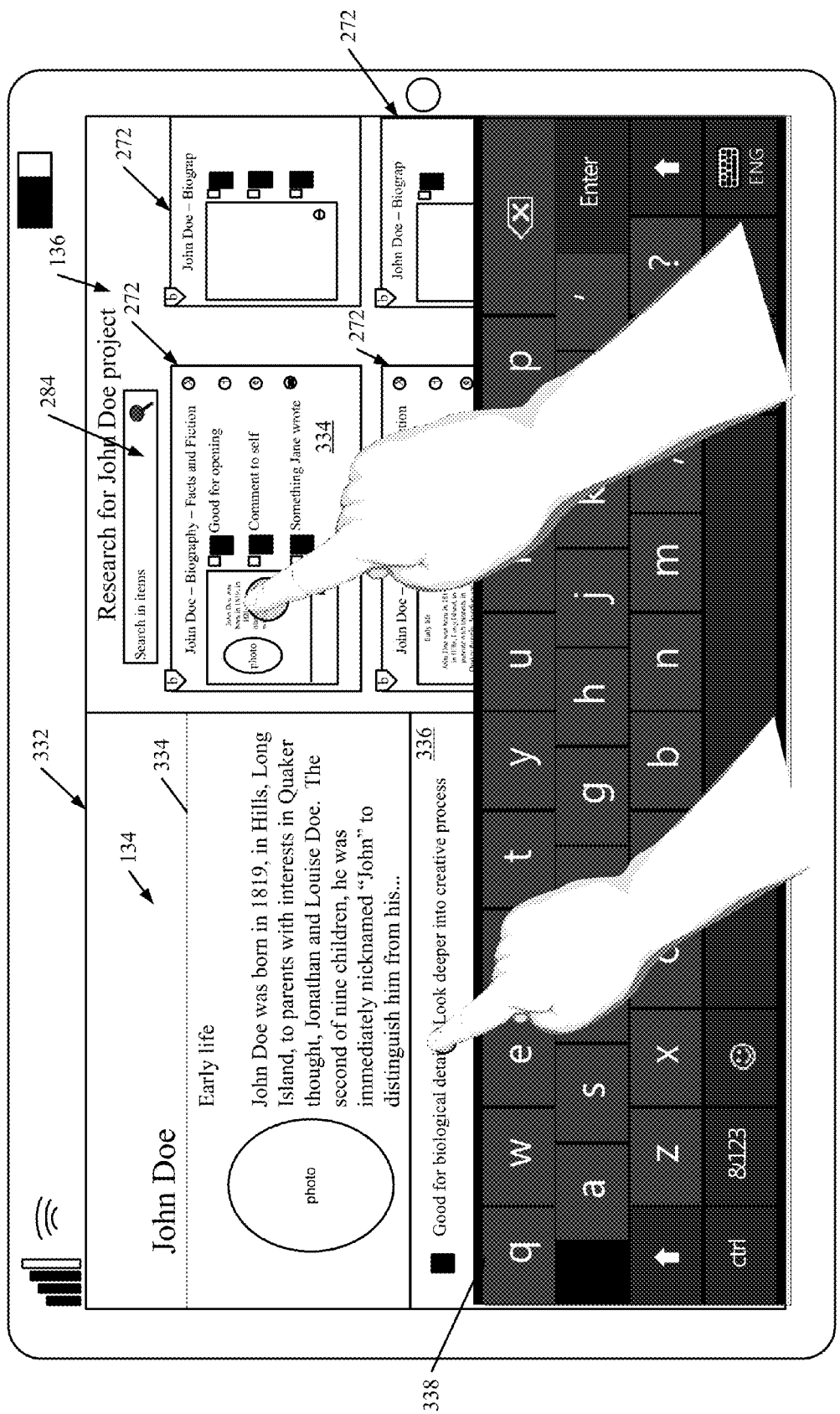
Figure 3M:
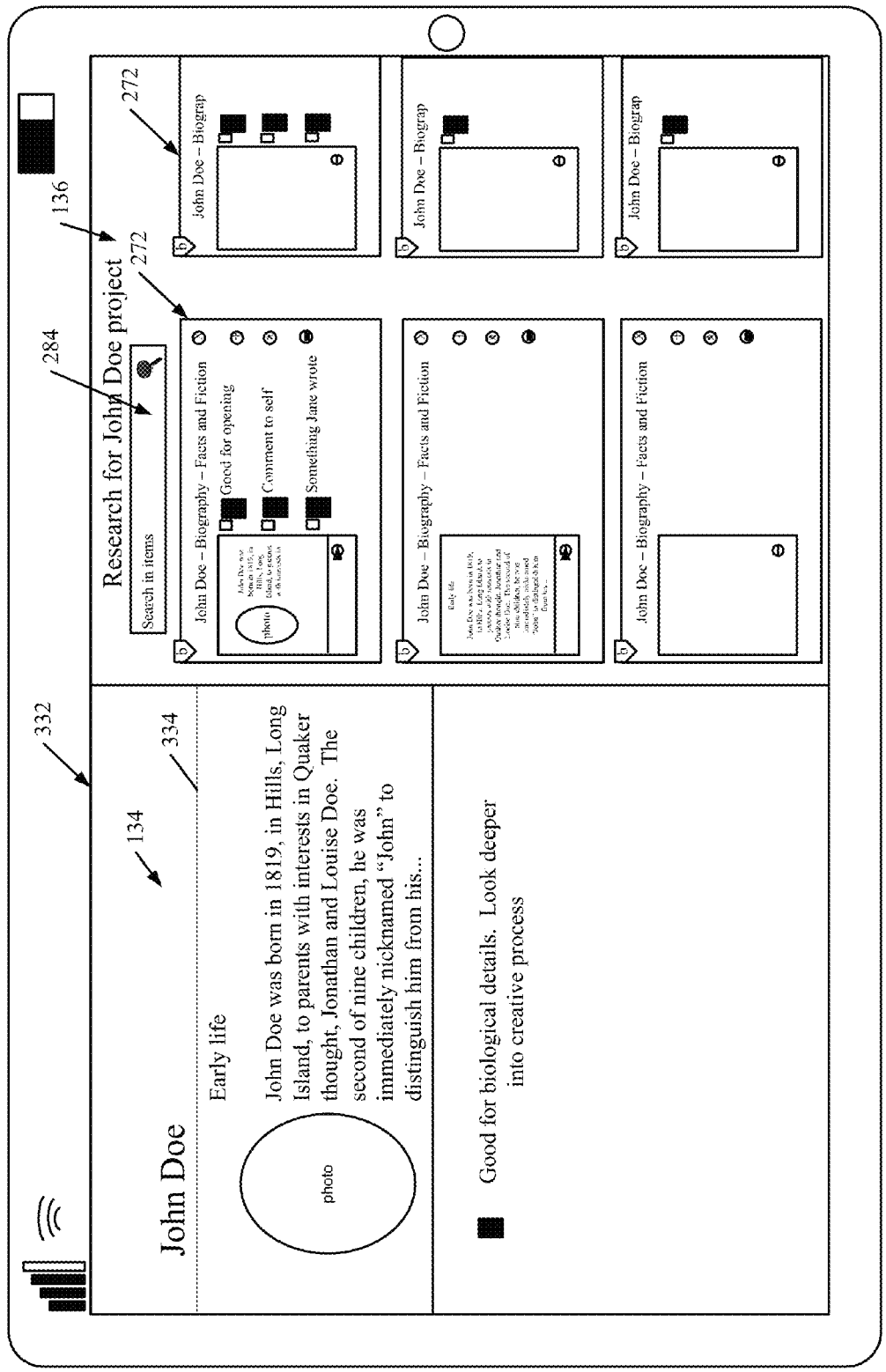

In order to do this, the user illustratively provides a suitable user input mechanism to indicate that user 110 wishes to add notes to this particular research item. Adding notes is indicated by block 330 in the flow diagram of FIG. 3, and FIG. 3L shows one illustrative user interface display 332 that indicates this. In the embodiment shown in FIG. 3L, the user has dragged a particular research item 334 from space 136 to space 134, and now the user wishes to add notes to that particular research item. Thus, in one embodiment, the user simply touches a notes portion 336 located on research item 334, and this causes document manipulation component 123 to display a soft keyboard 338. Thus, user 110 can type notes in portion 336. Of course, the notes can be added in other ways as well. FIG. 3M shows user interface display 332 with research item 334 placed within document workspace 134.

In another embodiment, document manipulation component 123 also allows user 110 to co-locate each of the research items 272 with respect to the document content 138. That is, the user can select one of the research items 272 and "pin" it at a location within document content 138, by using the "pin" actuator 210. In one embodiment, the user can simply place the cursor at a location inside document content 138, and then actuate the pin actuator of a particular research item 272. This creates a link from that location within document content 138 to that particular research item 272. The link can be a one-way link from the document content 138 to the research item 272 (or vise versa), or it can be a two-way link between the document content 138 and the particular research item 272. Thus, as the user is browsing document content 138, the user can simply actuate an icon corresponding to the link within the document content 138, and this causes the display of research organization space 136 to be updated to show the corresponding research item. In addition, if the user is browsing research items 272, and the user selects one of the research items, the display of document content 138 is updated to the location where the link to that research item is located. Co-locating research items with the document content is indicated by block 336 in the flow diagram of FIG. 3.

Figure 3N:
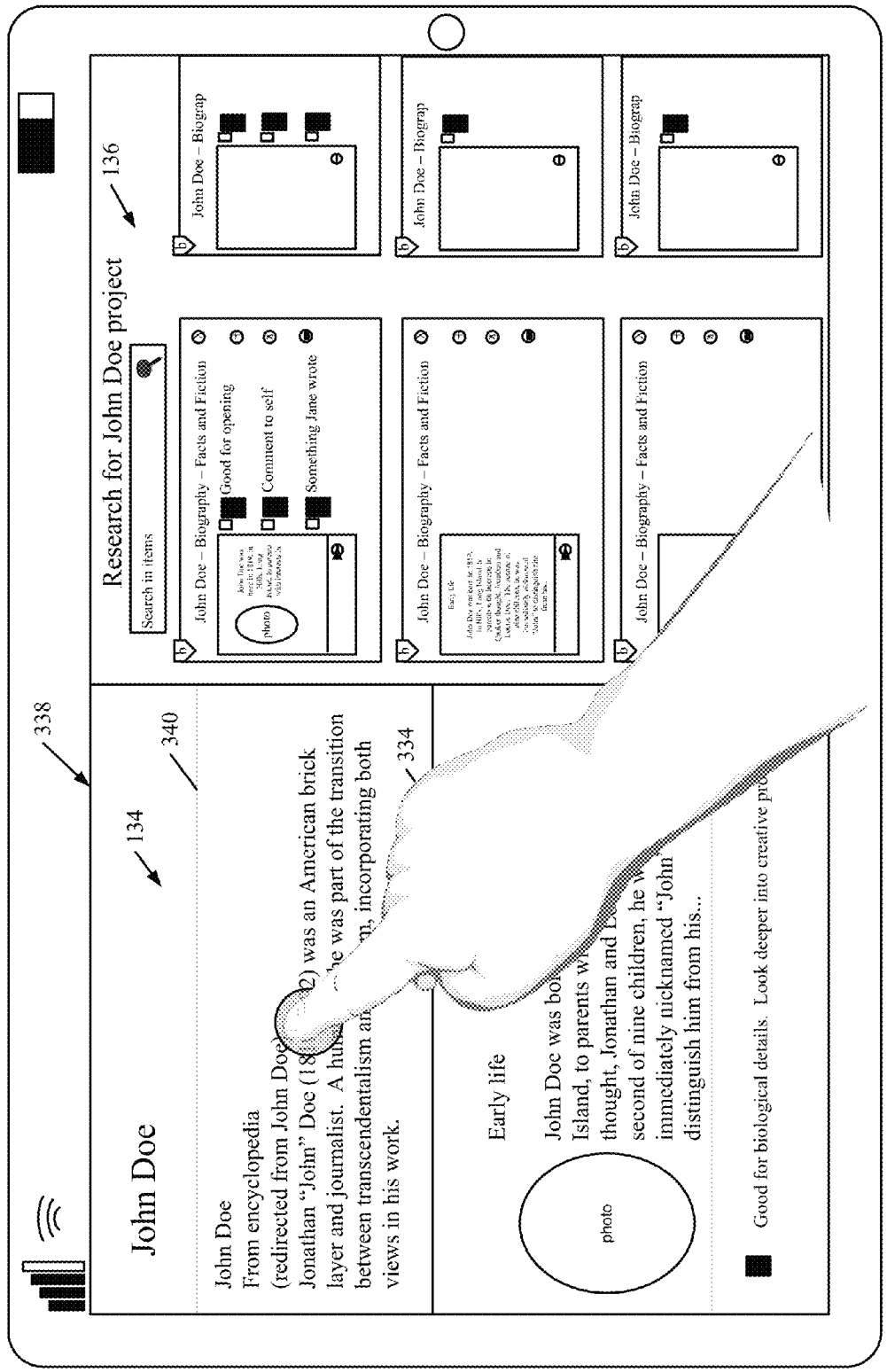

FIG. 3N shows another user interface display 338, which is similar to user interface display 332 shown in FIG. 3M, and similar items are similarly numbered. However, user interface display 338 shows that the user 110 has now added a second research item 340 above research item 334 in the document workspace 134. In one embodiment, document manipulation component 123 reorders the research items in research organization space 136 so that they correspond to that within the document content 138. Alternatively, of course, each research item can be deleted from research organization space 136, as it is placed in document content 138 in document workspace 134.

It will also be noted that, in one embodiment, the user can type text in document content 138. For instance, the user can provide a suitable user input, such as tapping document workspace 134, or actuating an appropriate user input mechanism, or providing some other user input. This illustratively causes a keyboard to be displayed so that the user can type text within document content 138. Typing document content is indicated by block 344 in the flow diagram of FIG. 3.

The user can also provide other inputs in order to modify the research items or the document content. This is indicated by block 346.

After the user has provided the appropriate user inputs, document manipulation component 123 modifies the research items or document content based on the user input (as described above). This is indicated by block 348.

It should also be noted, that in one embodiment, the research items for a given document 104 can be stored not only within document 104, but separate from document 104 as well. In that way, the research items, themselves, can be provided as an output stored for access, by a separate system. This may be helpful in a number of different scenarios.

For example, assume that user 110 is generating the research items 272 in order to plan the sequence of events in the user's wedding. Thus, document content 138 may be a textual description of the events, while the research items are links to the various facilities that will be used during the event, the caterers, etc. Document content 138, itself, may also reflect specific choices made, such as menu items, color schemes, dresses or other clothing, etc.), while the research items 272 may simply be the contact information for the caterer, the dress maker, the cake maker, etc. In that case, user 110 may wish to simply provide the research items (the contact information) as an output for use by another person who is also planning a wedding. In this way, the other person need not have access to all of the specific choices made by user 110 in planning the wedding, but the other person may have access to all the content information and resources reflected in the research items.

In another scenario, an instructor may provide a closed library of research items from which students are to write a paper. The professor can thus generate the research items. The document content 138 may be an outline of a paper that the professor wishes to receive, but the professor does not wish to provide access to that outline to the students. Therefore, the professor can simply provide the students with a packet that includes the research items, without necessarily having access to the document content 138, itself.

There are a wide variety of other scenarios where providing the research items as a separate output (separate from document content 138) may be desired. Those described above are described for the sake of example only. Saving the research for output separate from the document is indicated by block 350 in the flow diagram in FIG. 3.

FIG. 4 is a block diagram of architecture 100, shown in FIG. 1, except that it's elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 4, some items are similar to those shown in FIG. 1 and they are similarly numbered. FIG. 4 specifically shows that research system 102 is located in cloud 502 (which can be public, private, or a combination where portions are public while others are private). Therefore, user 110 uses user device 116 that to access those systems through cloud 502.

FIG. 4 also depicts another embodiment of a cloud architecture. FIG. 4 shows that it is also contemplated that some elements of architecture 100 or system 102 can be disposed in cloud 502 while others are not. By way of example, data store 108 can be disposed outside of cloud 502, and accessed through cloud 502. In another embodiment, document application 106 is also outside of cloud 502. Regardless of where they are located, they can be accessed directly by device 116, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
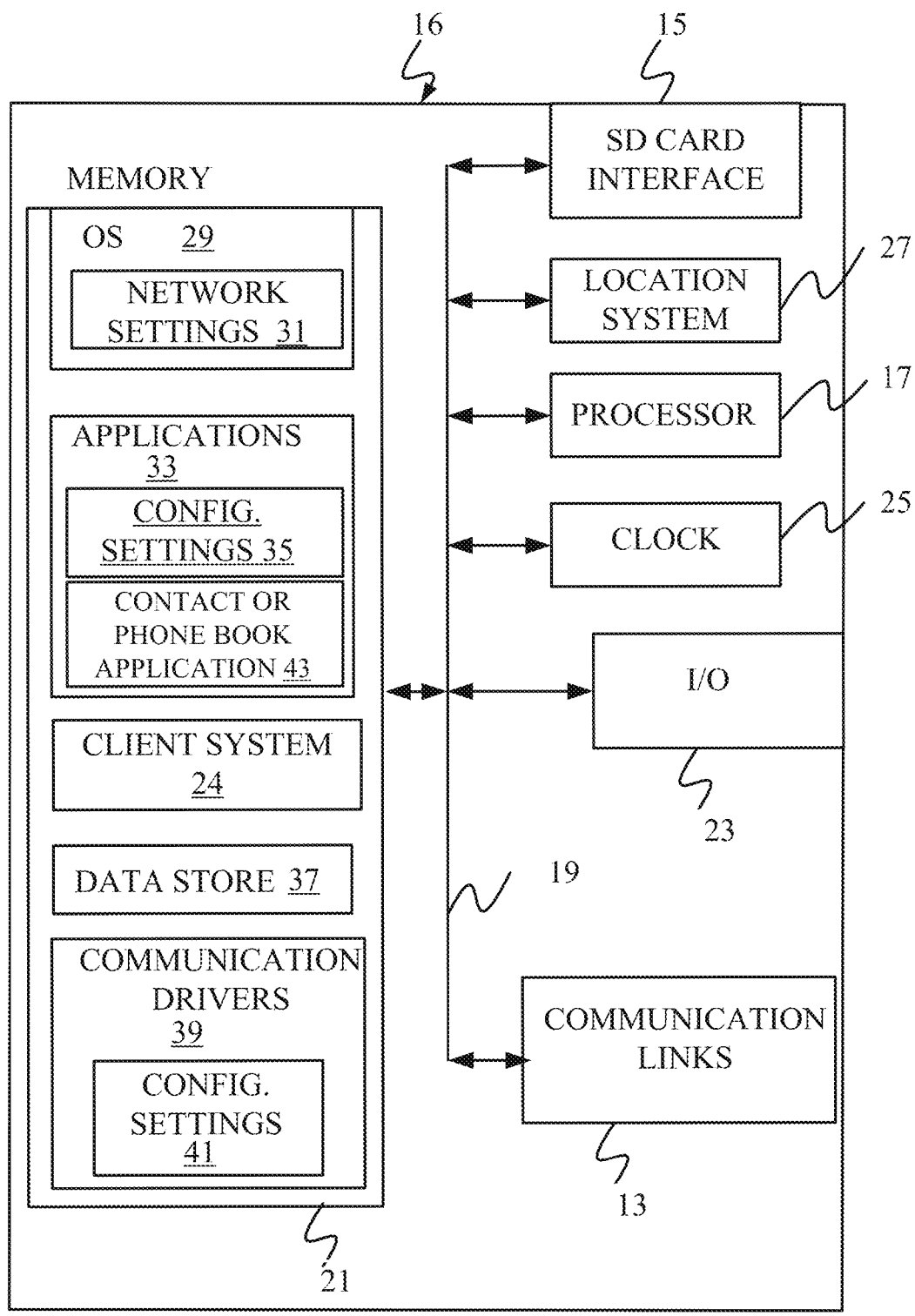
FIGS. 5-10 show embodiments of mobile devices.

FIG. 5 is a simplified block diagram of one illustrative embodiment of a handheld or mobile computing device that can be used as a user's or client's hand held device 16, in which the present system (or parts of it) can be deployed. FIGS. 6-10 are examples of handheld or mobile devices.

FIG. 5 provides a general block diagram of the components of a client device 16 that can run components of architecture 100 or system 102 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xRTT, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 124 or 130 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Application 106 or the items in data store 108, for example, can reside in memory 21. Similarly, device 16 can have a client system 24 which can run various business applications or embody parts or all of system 102. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 6:
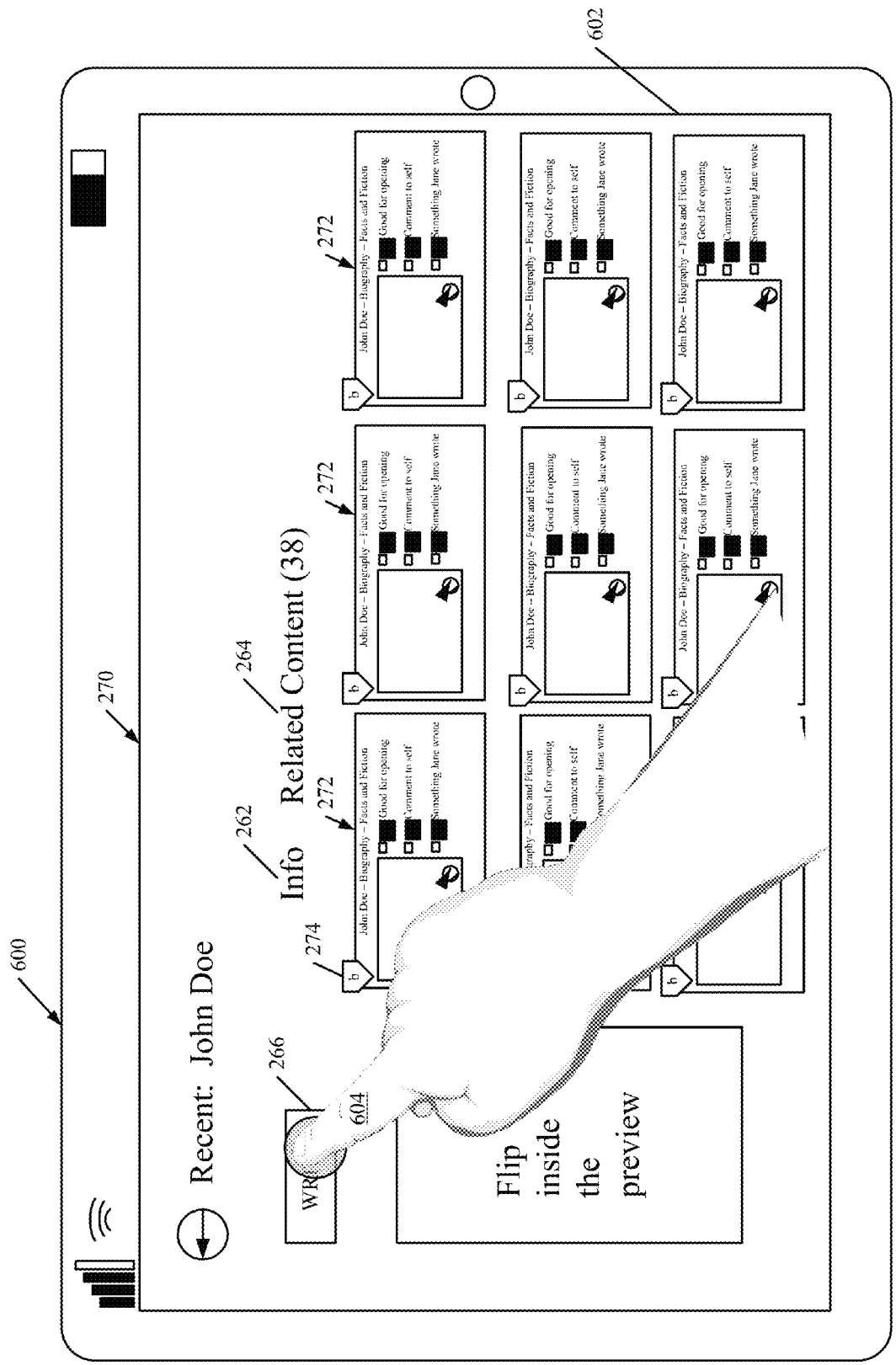

FIG. 6 shows one embodiment in which device 16 is a tablet computer 600. In FIG. 6, computer 600 is shown with user interface display 270 (From FIG. 3D) displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 7:
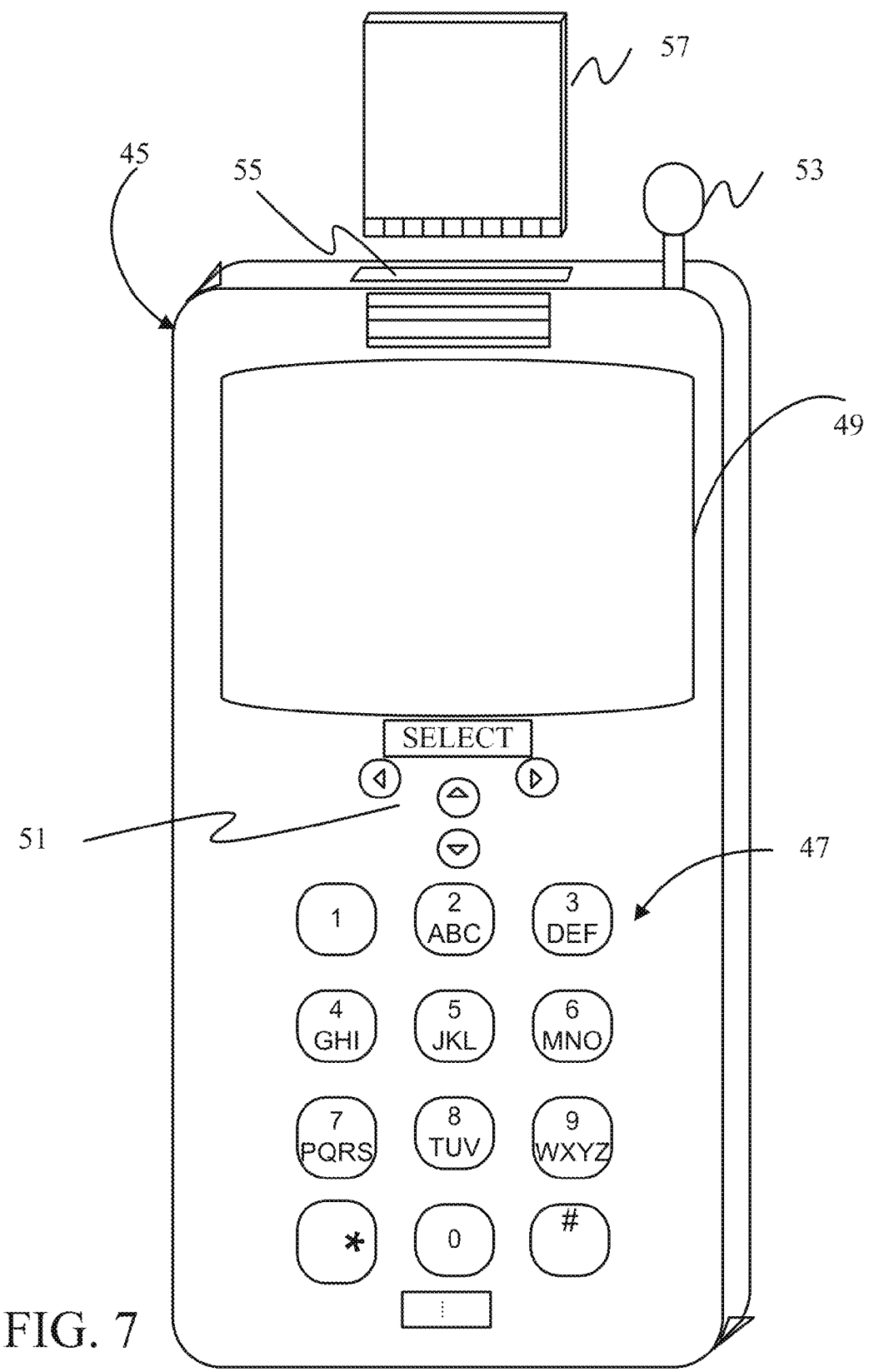
Figure 8:
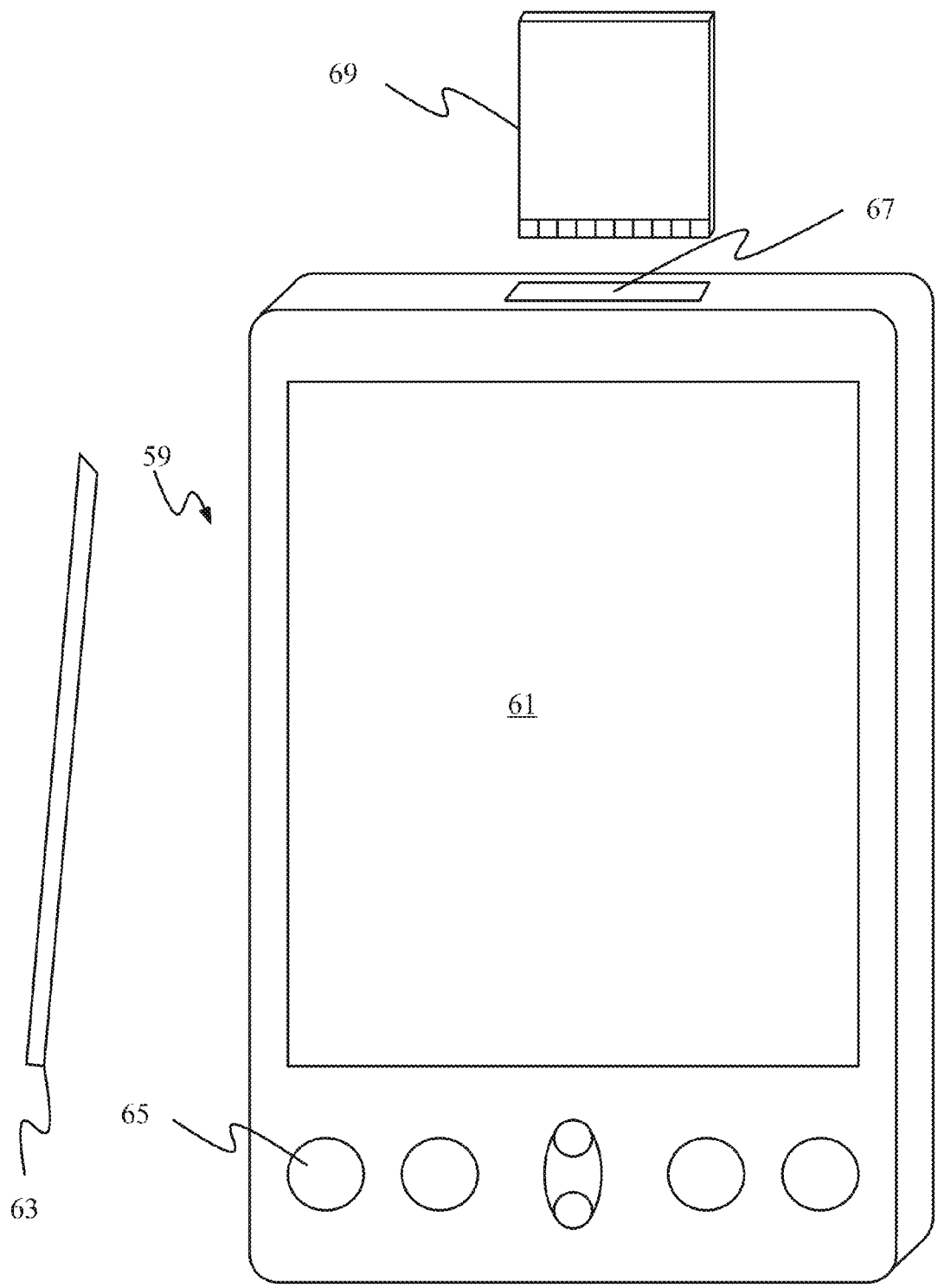

FIGS. 7 and 8 provide additional examples of devices 16 that can be used, although others can be used as well. In FIG. 7, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 8 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 9:
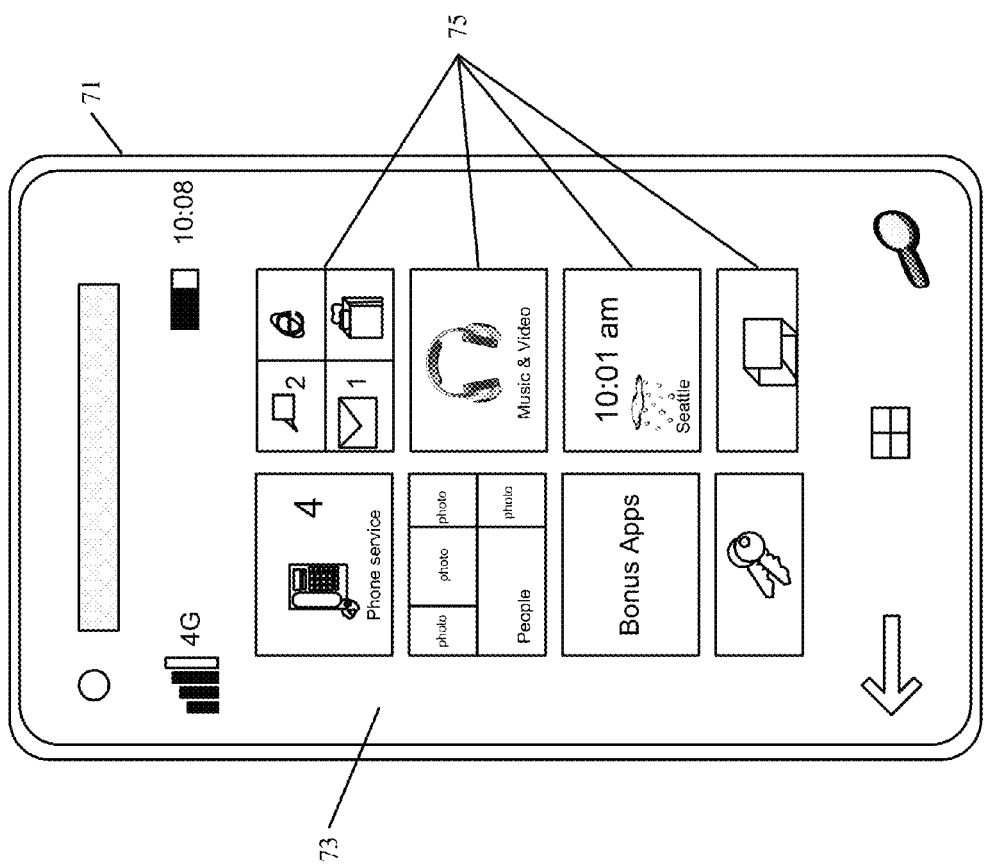
Figure 10:
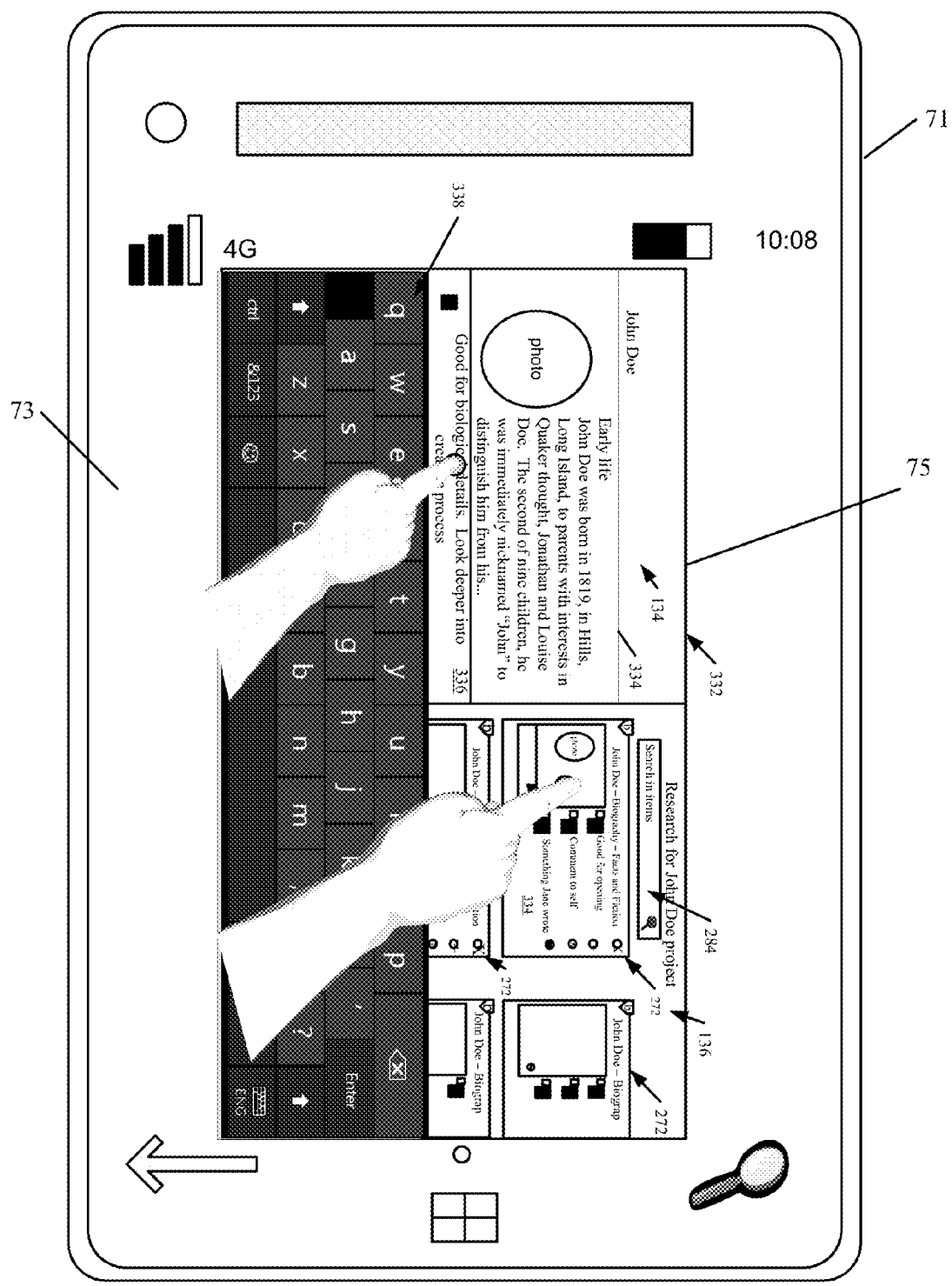

FIG. 9 is similar to FIG. 7 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. FIG. 10 shows smart phone 71 with the display of FIG. 3L displayed on it.

Note that other forms of the devices 16 are possible.

Figure 11:
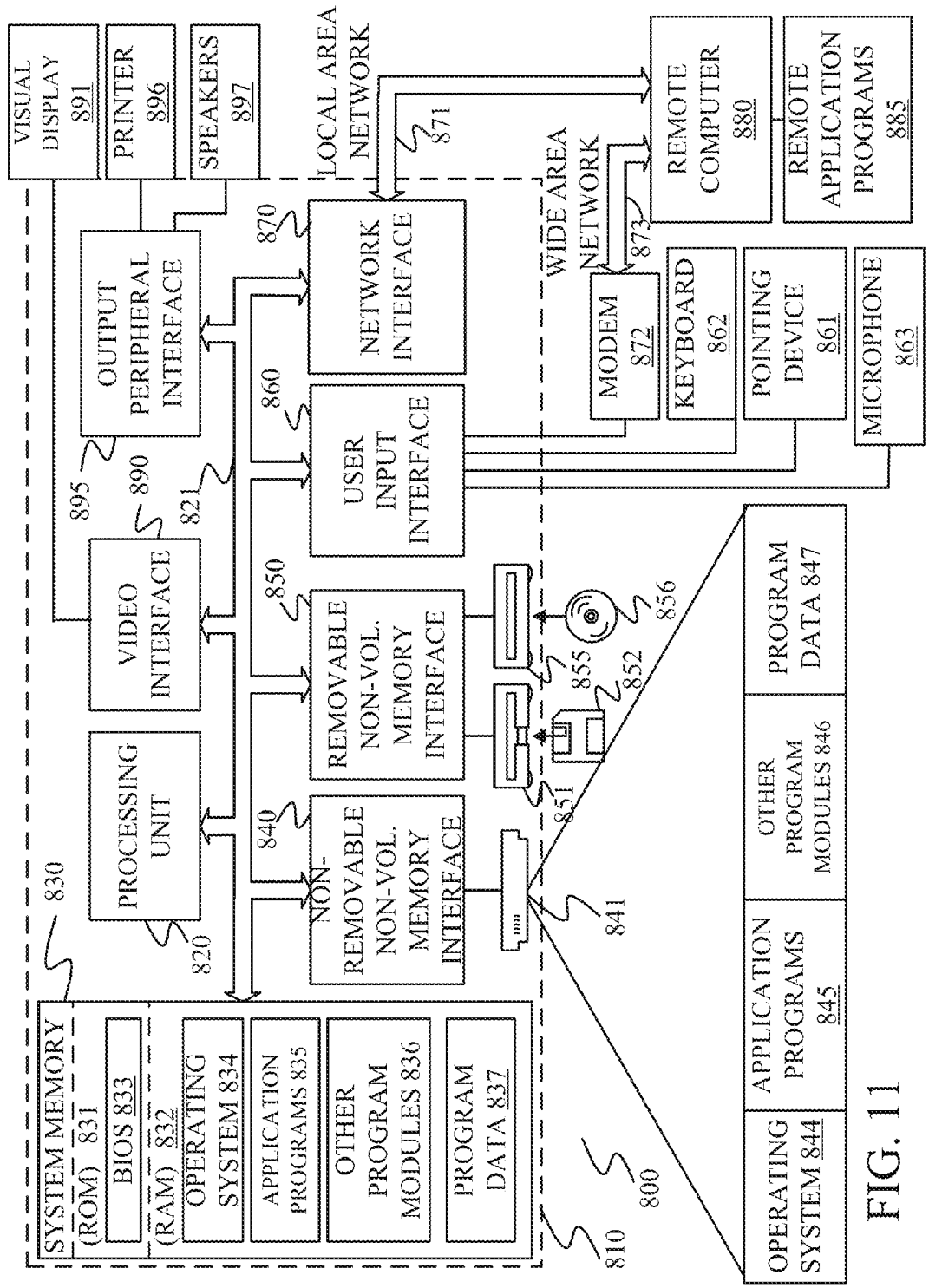
FIG. 11 is a block diagram of one embodiment of a computing environment.

FIG. 11 is one embodiment of a computing environment in which architecture 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 124 or 130), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of authoring a document, comprising:
   obtaining a plurality of research items, each research item indicative of corresponding research material;
   displaying a user interface having a research organization display space and a document workspace, wherein the document workspace is visually separate from the research organization display space and includes a user input mechanism for modifying document content from the document that is displayed in the document workspace, the document content comprising content other than the research material;
   displaying the plurality of research items in the research organization display space, wherein each research item is represented in the research organization display space by a user interface element having a content portion that visually indicates the corresponding research material for the research item;
   receiving a user modification input through the user input mechanism in the document workspace;
   based on the user modification input, modifying the document content displayed in the document workspace;
   receiving a user co-location input;
   based on the user co-location input, selecting one of the research items displayed in the research organization display space and selecting a location in the document content from the document;
   generating an association between the selected location in the document content and the selected research item; and
   modifying the user interface to visually represent the generated association between the selected research item and the selected location, wherein modifying the user interface comprises at least one of:
   adding, at the selected location in the document content, at least a portion of the corresponding research material for the selected research item; or placing, at the selected location in the document content, a link to the selected research item.

2. The computer-implemented method of claim 1 wherein receiving a user co-location input comprises:
   receiving a user input placing the selected research item at the selected location in the document workspace, wherein the selected research item is displayed at the selected location in the document workspace.

3. The computer-implemented method of claim 2 and further comprising:
   in response to receiving the user input placing the selected research item at the selected location in the document workspace, deleting the selected research item from the research organization display space.

4. The computer-implemented method of claim 1, and further comprising:
   receiving a note taking input indicative of notes for a particular one of the research items; and modifying the user interface element, that represents the particular research item in the research organization display space, to include the notes, wherein the notes are displayed in the research organization display space.

5. The computer-implemented method of claim 1, wherein modifying the user interface to visually represent the association between the selected research item and the selected location comprises:
  placing, at the selected location in the document workspace, a link to the selected research item.

6. The computer-implemented method of claim 1, wherein modifying the user interface to visually represent the association between the selected research item and the selected location comprises:
  placing, on the user interface element that represents the selected research item, a link to the selected location in the document content.

7. The computer-implemented method of claim 1, and further comprising:
  receiving a search input in a search box in the research organization display space;
  identifying one or more research items, from the plurality of research items, based on the search input; and
  displaying the one or more research items in the research organization display space.

8. The computer-implemented method of claim 1 wherein obtaining a plurality of research items comprises:
  receiving a user capture input identifying research material to be captured; and
  generating a research item corresponding to the identified research material to be captured.

9. The computer-implemented method of claim 8, and further comprising:
  receiving a user add input; and
  in response to the user add input, adding the generated research item to the research organization display space.

10. The computer-implemented method of claim 8 wherein the user interface element that represents each research item displayed in the research organization display space comprises a source link to a source of the research material for the research item.

11. The computer-implemented method of claim 10 wherein the user interface element for each research item comprises a research card having a source mechanism identifier indicative of a mechanism used to identify the research material corresponding to the research item.

12. A computing system comprising:
  a capture component configured to receive a material capture user input identifying research material and generate a plurality of research items representing the identified research material, using a computer processor;
  an add component configured to add the plurality of research items to a document; a user interface component configured to:
  generate a document display having a document workspace and a research organization space, wherein the document workspace and the research organization space comprise visually separated panes in the document display;
  display content from the document in the document workspace;
  display the plurality of research items in the research organization space, wherein each research item, of the plurality of research items, is represented in the research organization space by a user interface element comprising:
  a title portion that displays a title for the research item;
  a content portion that visually represents the research material for the research item; and
  a source link to a source of the research material;
  receive a user modification input to modify the document content within the document workspace;
  receive a user search input;
  based on the user search input, obtain a search result by executing a search of the plurality of research items in the research organization space, wherein the search is executed separate from the document content in the document workspace and the search result identifies a particular one of the research items; and display an indication of the search result.

13. The computing system of claim 12, wherein the user interface component is configured to generate the document display with a research project title user interface element that displays a research project title associated with the document.

14. The computing system of claim 12 wherein the user interface component is configured to receive a document selection input selecting the document and generate a preview of the document with a research content selection input mechanism which, when actuated, displays research items in the selected document.

15. The computing system of claim 12 wherein the add component is configured to store the research item for access by another system, separate from the document content.

16. A computing system comprising:
  at least one processor; and
  memory storing instructions executable by the at least one processor, wherein the instructions, when executed, configure the computing system to:
  obtain a plurality of research items, each research item being indicative of corresponding research material;
  display a user interface having a research organization display space and a document workspace, wherein the document workspace is visually separate from the research organization display space and includes a user input mechanism for modifying document content from the document that is displayed in the document workspace, the document content comprising content other than the research material;
  display the plurality of research items in the research organization display space, wherein each research item is represented in the research organization display space by a user interface element having a content portion that visually indicates the corresponding research material for the research item;
  receive a user modification input through the user input mechanism in the document workspace;
  based on the user modification input, modify the document content displayed in the document workspace;
  receive a user co-location input;
  based on the user co-location input, select one of the research items displayed in the research organization display space and select a location in the document content from the document;
  generate an association between the selected location in the document content and the selected research item; and
  modify the user interface display to visually represent the generated association between the selected research item and the selected location, wherein the modified user interface display comprises at least one of:
  a portion of the corresponding research material, for the selected research item, added at the selected location in the document content; and
  a link, to the selected research item, placed at the selected location in the document content.

17. The computing system of claim 16, wherein the instructions configure the computing system to:
- display each research item in the research organization space with a notes user input mechanism;
- receive a user input through the notes user input mechanism of a particular one of the research items;
- receive a user input indicative of an annotation to the particular research item; and
- display the annotation with the particular research item in the research organization space.

18. The computing system of claim 16, wherein the instructions configure the computing system to:
- receive a user capture input identifying research material to be captured; and
- generate a research item corresponding to the identified research material to be captured, the generated research item being included in the obtained plurality of research items.

19. The computing system of claim 16, wherein the instructions configure the computing system to:
- in response to a portion of the corresponding research material, for the selected research item, being added at the selected location in the document content, delete the selected research item from the research organization space.

20. The computing system of claim 16, wherein the instructions configure the computing system to:
- receive a search input in a search box in the research organization space;
- identify one or more research items, from the plurality of research items, based on the search input; and
- display the one or more identified research items in the research organization space.

\* \* \* \* \*